March 25, 1930.   O. G. SIMMONS   1,752,033
METHOD AND APPARATUS FOR GENERATING GEAR TEETH
Filed March 31, 1926   18 Sheets-Sheet 1

INVENTOR:

March 25, 1930.　　　　O. G. SIMMONS　　　　1,752,033
METHOD AND APPARATUS FOR GENERATING GEAR TEETH
Filed March 31, 1926　　　18 Sheets-Sheet 2

INVENTOR:

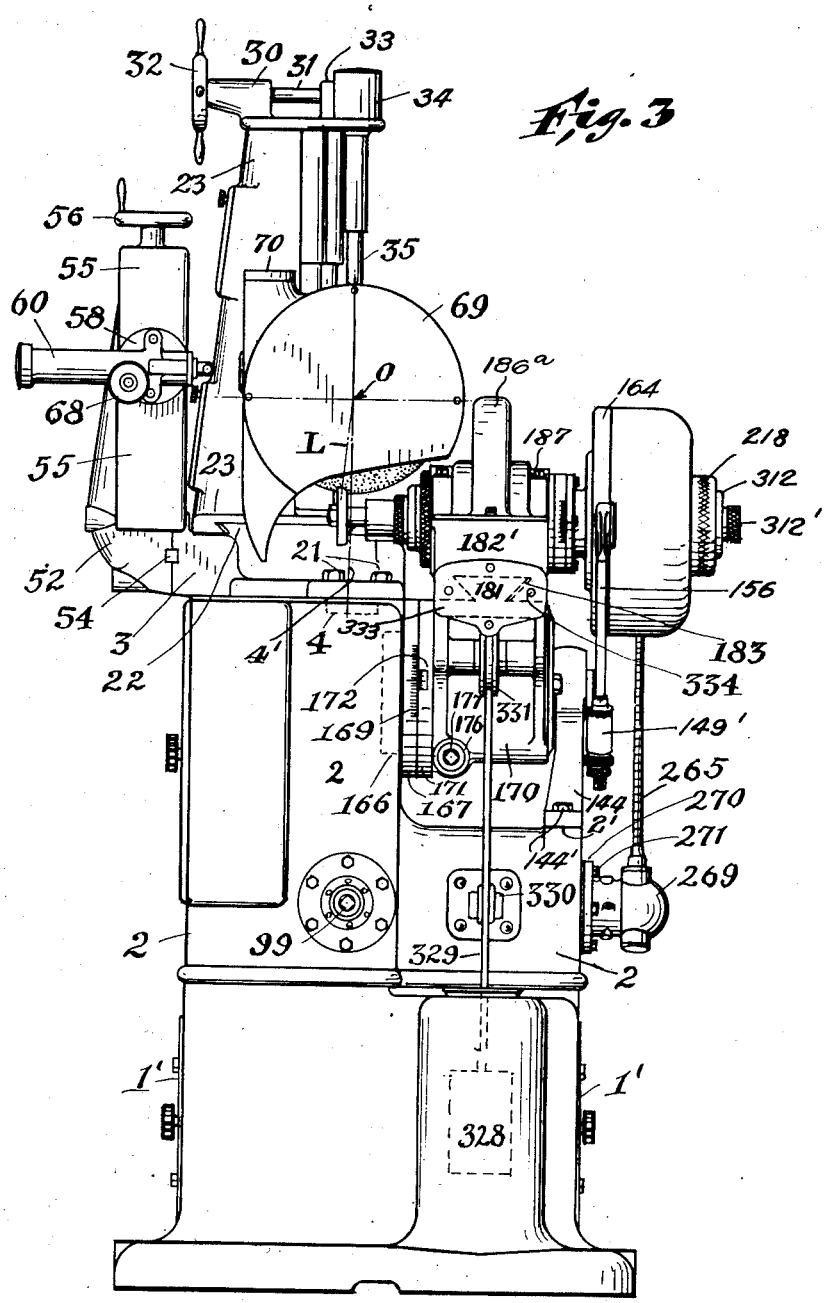

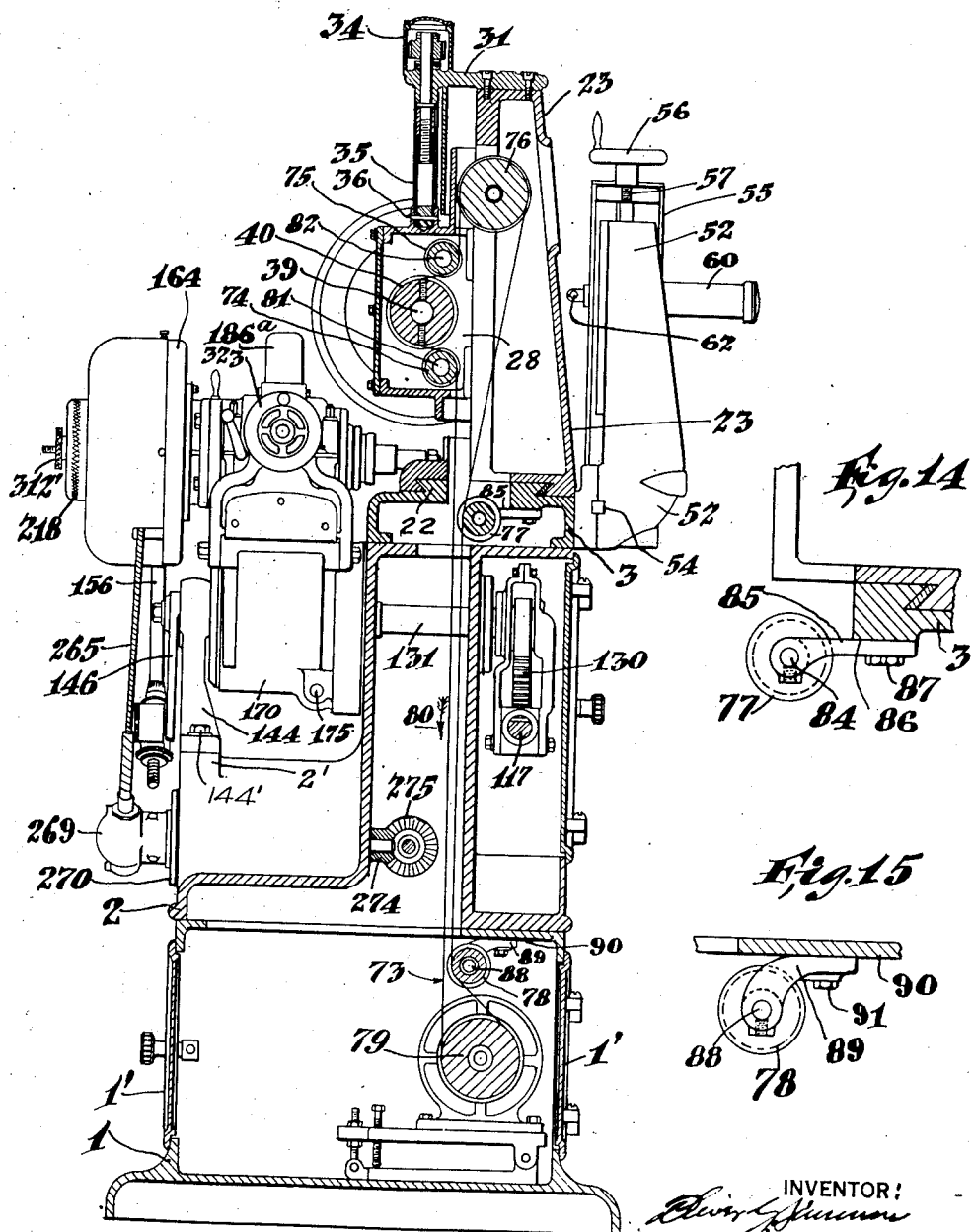

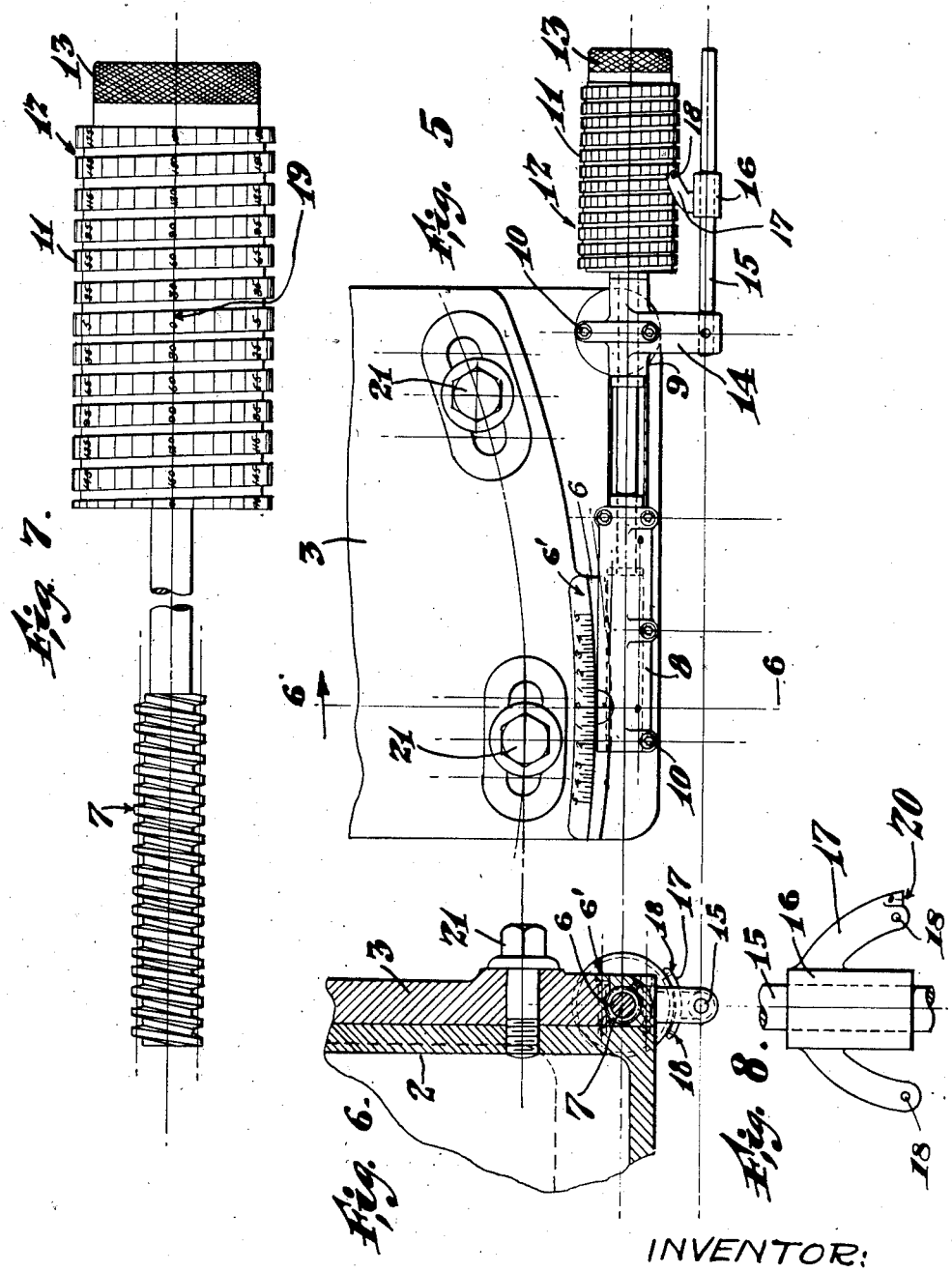

March 25, 1930.    O. G. SIMMONS    1,752,033
METHOD AND APPARATUS FOR GENERATING GEAR TEETH
Filed March 31, 1926    18 Sheets-Sheet 6
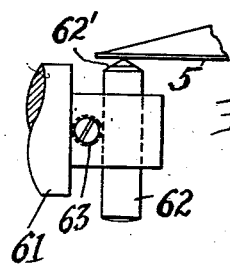
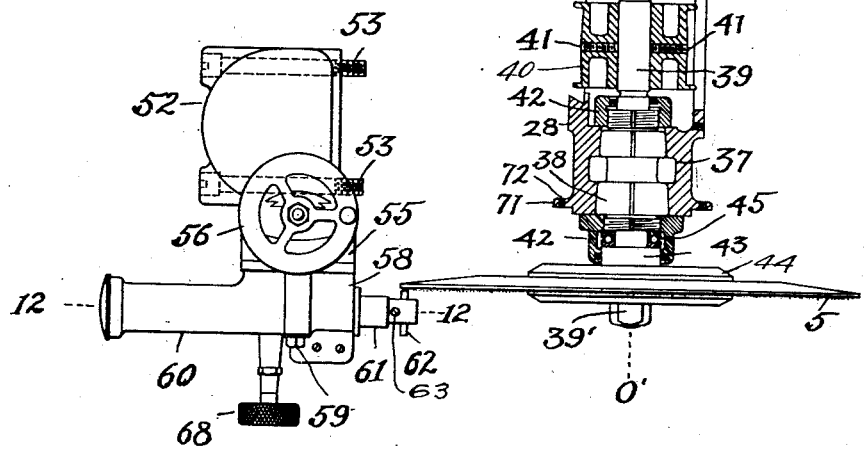
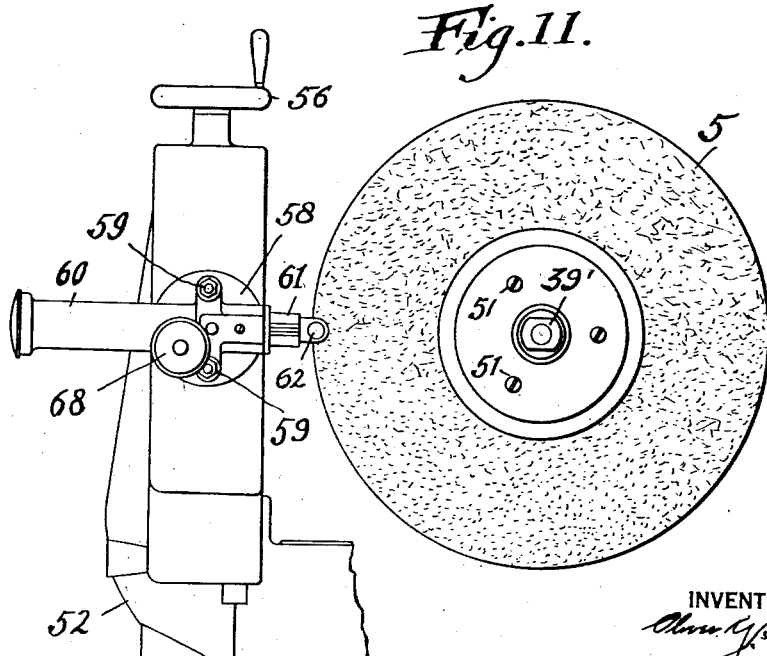
INVENTOR
Oliver G. Simmons
ATTORNEYS March 25, 1930.   O. G. SIMMONS   1,752,033
METHOD AND APPARATUS FOR GENERATING GEAR TEETH
Filed March 31, 1926   18 Sheets-Sheet 7
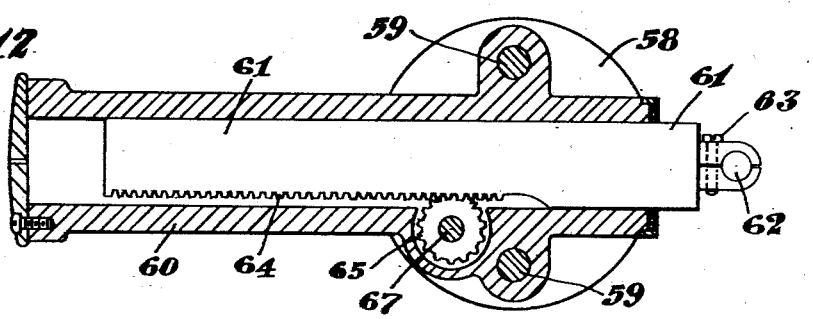
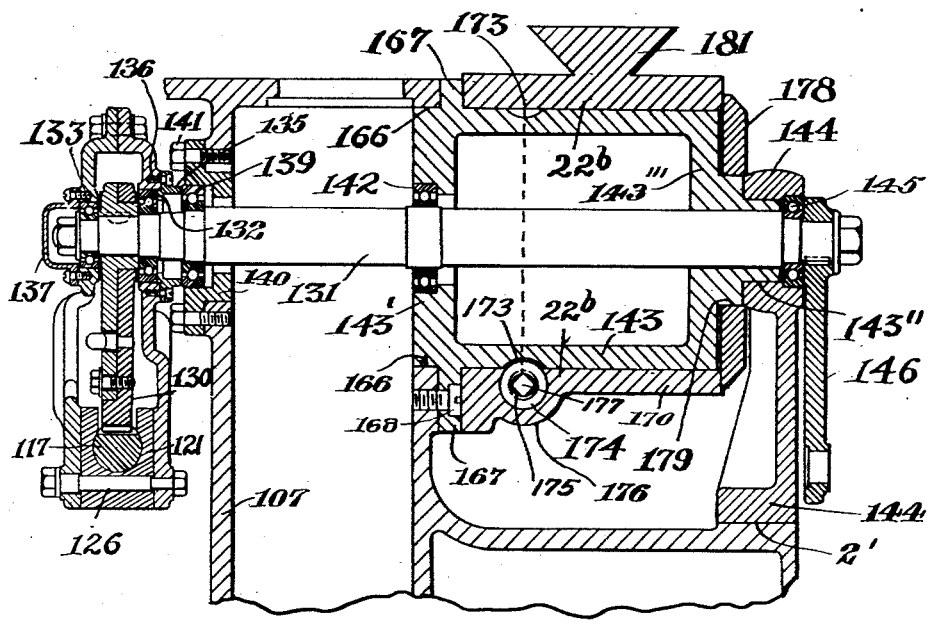

March 25, 1930.　　O. G. SIMMONS　　1,752,033
METHOD AND APPARATUS FOR GENERATING GEAR TEETH
Filed March 31, 1926　　18 Sheets-Sheet 8
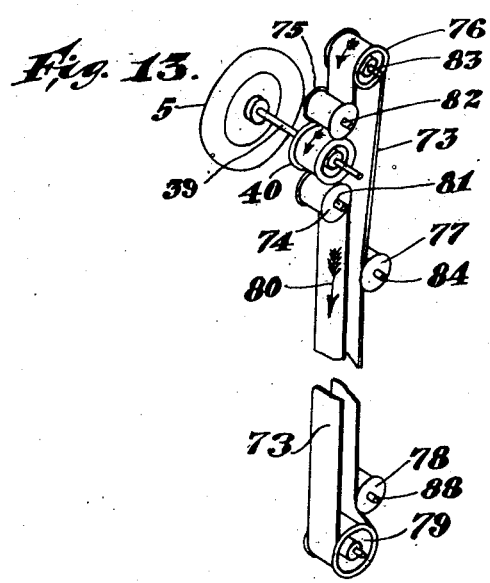
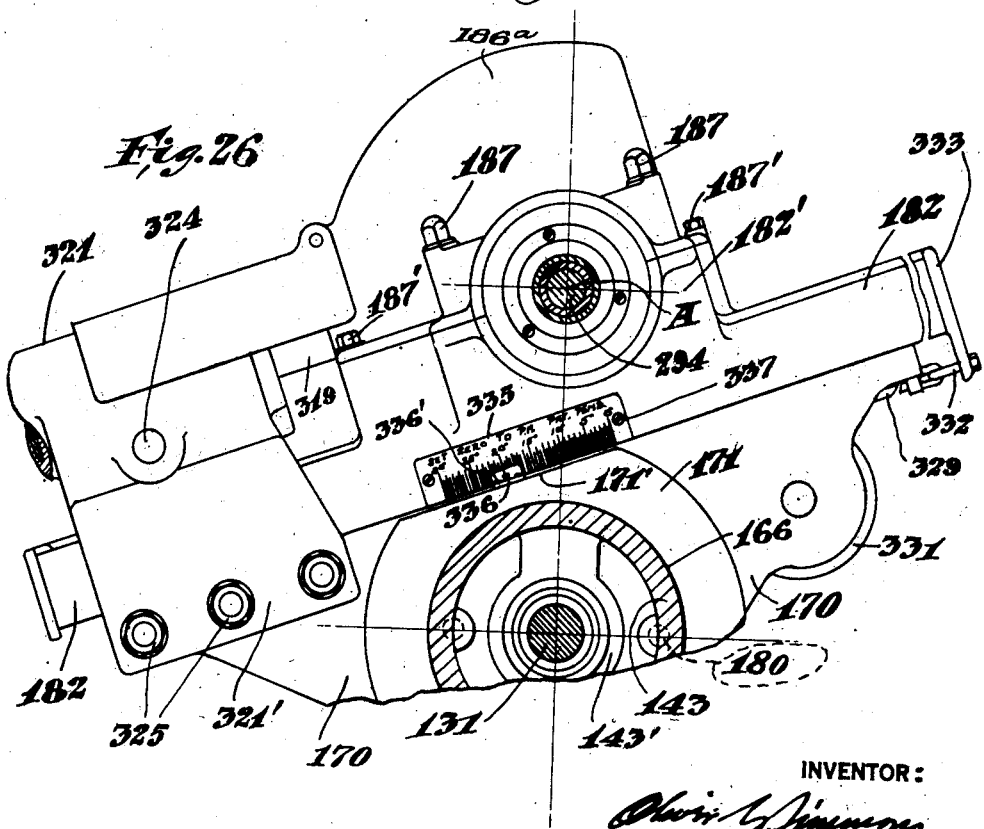
INVENTOR:

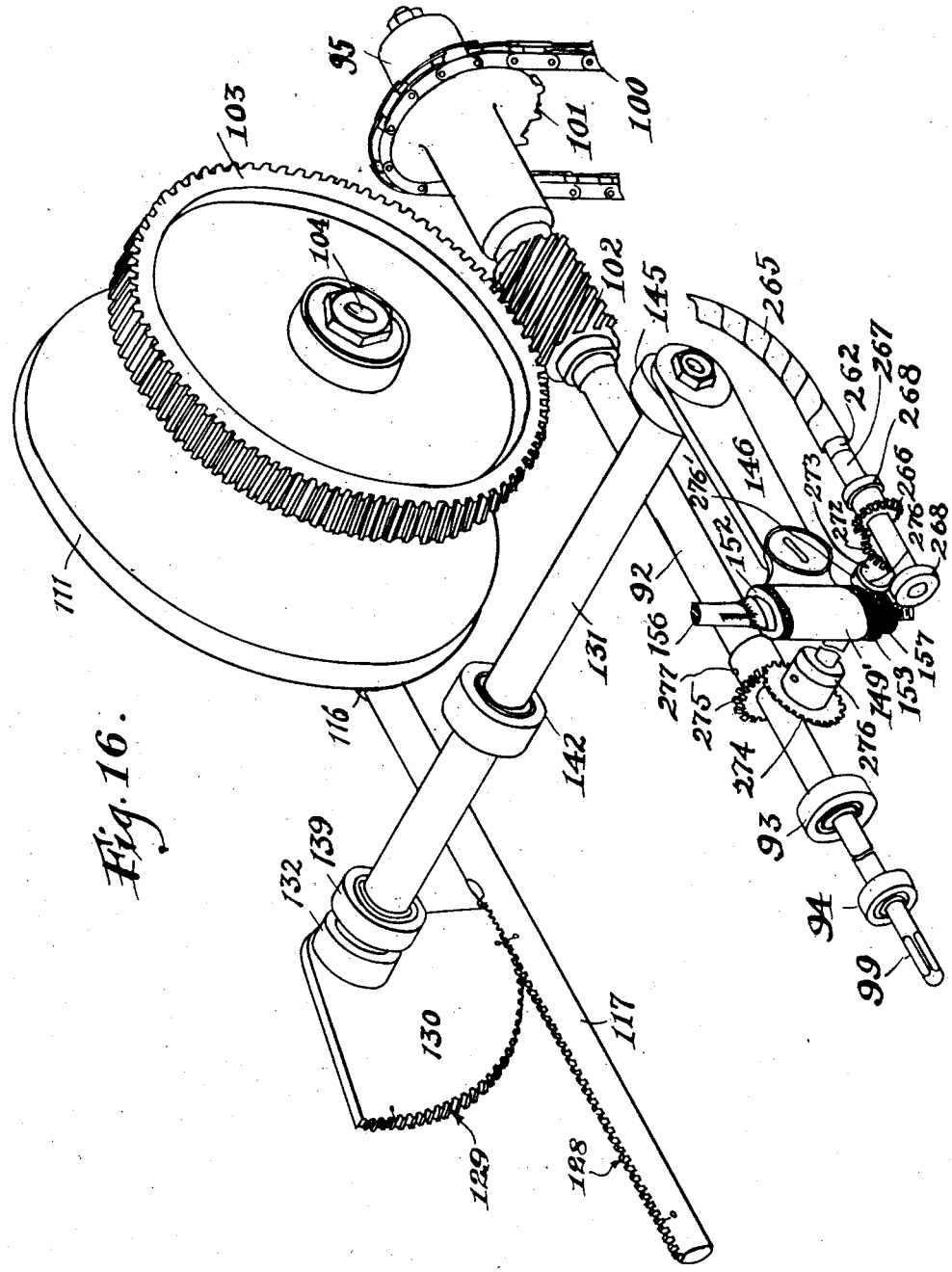

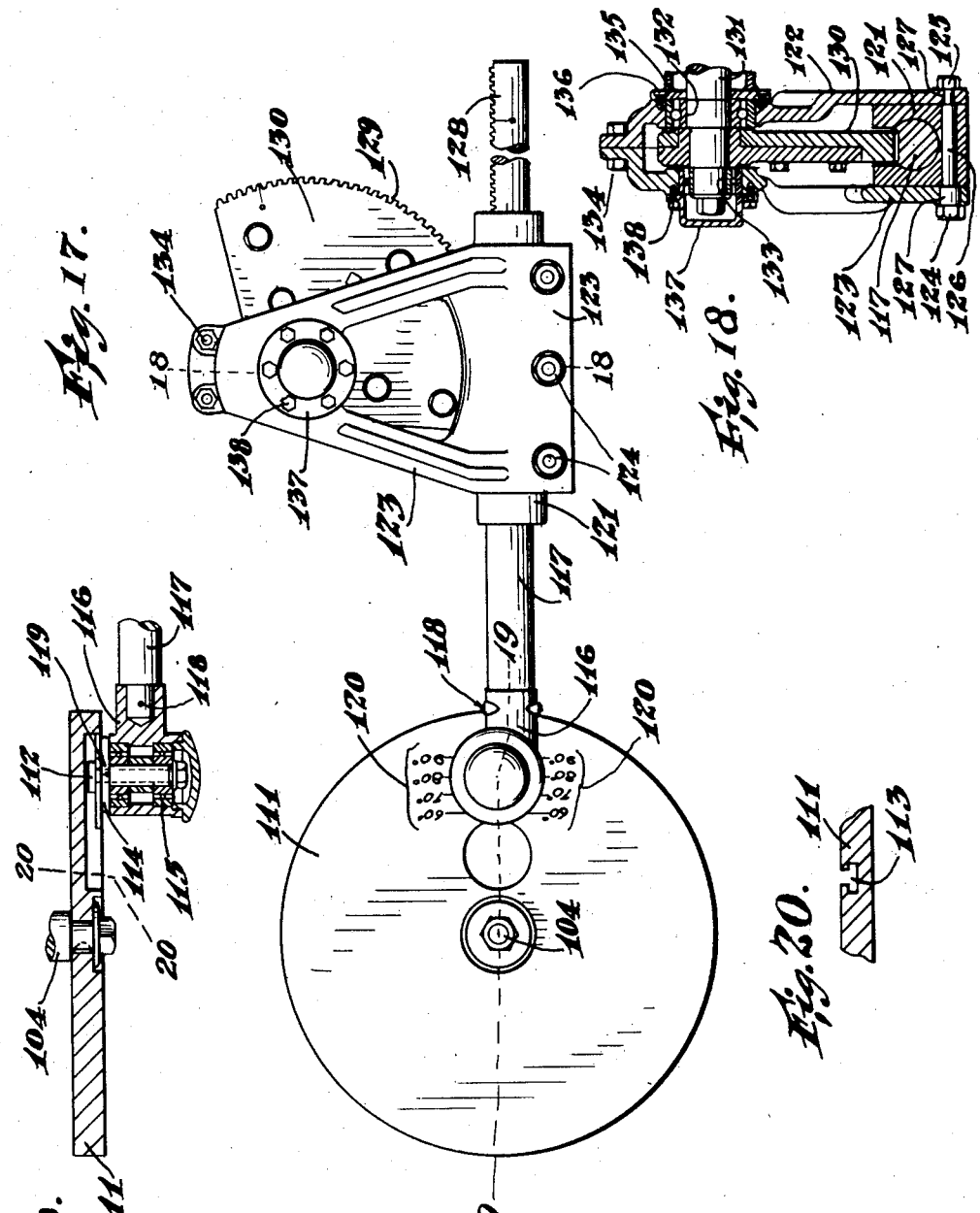

March 25, 1930.   O. G. SIMMONS   1,752,033
METHOD AND APPARATUS FOR GENERATING GEAR TEETH
Filed March 31, 1926    18 Sheets-Sheet 11
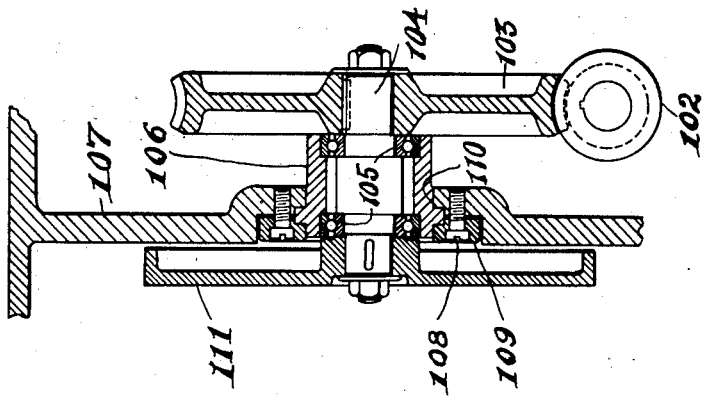
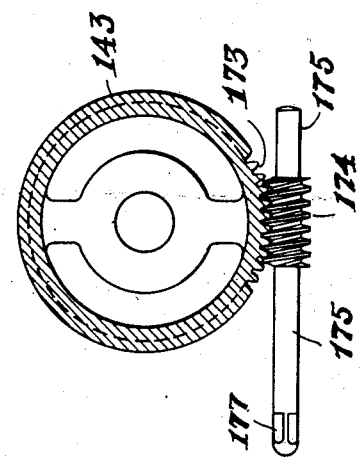
INVENTOR

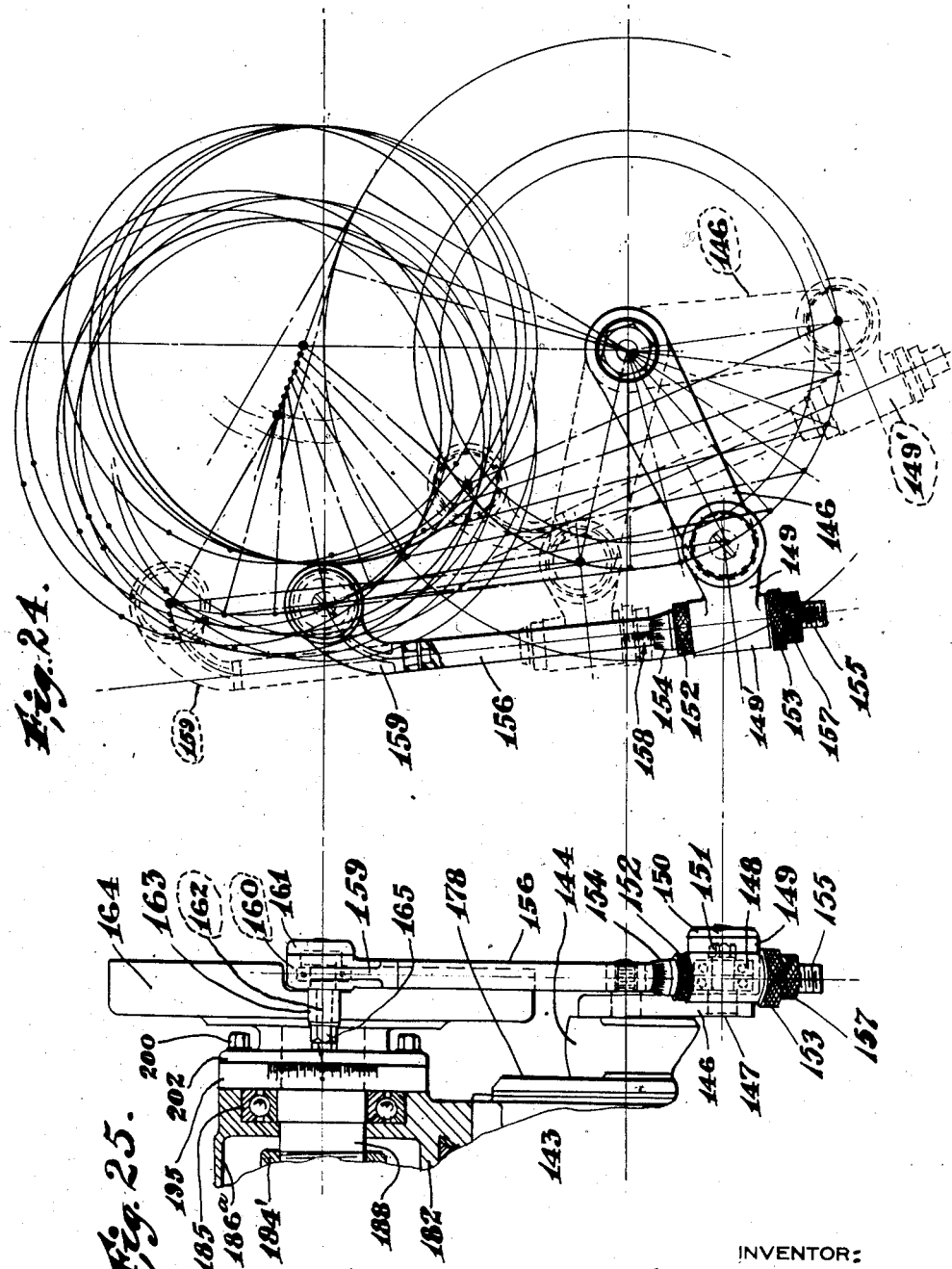

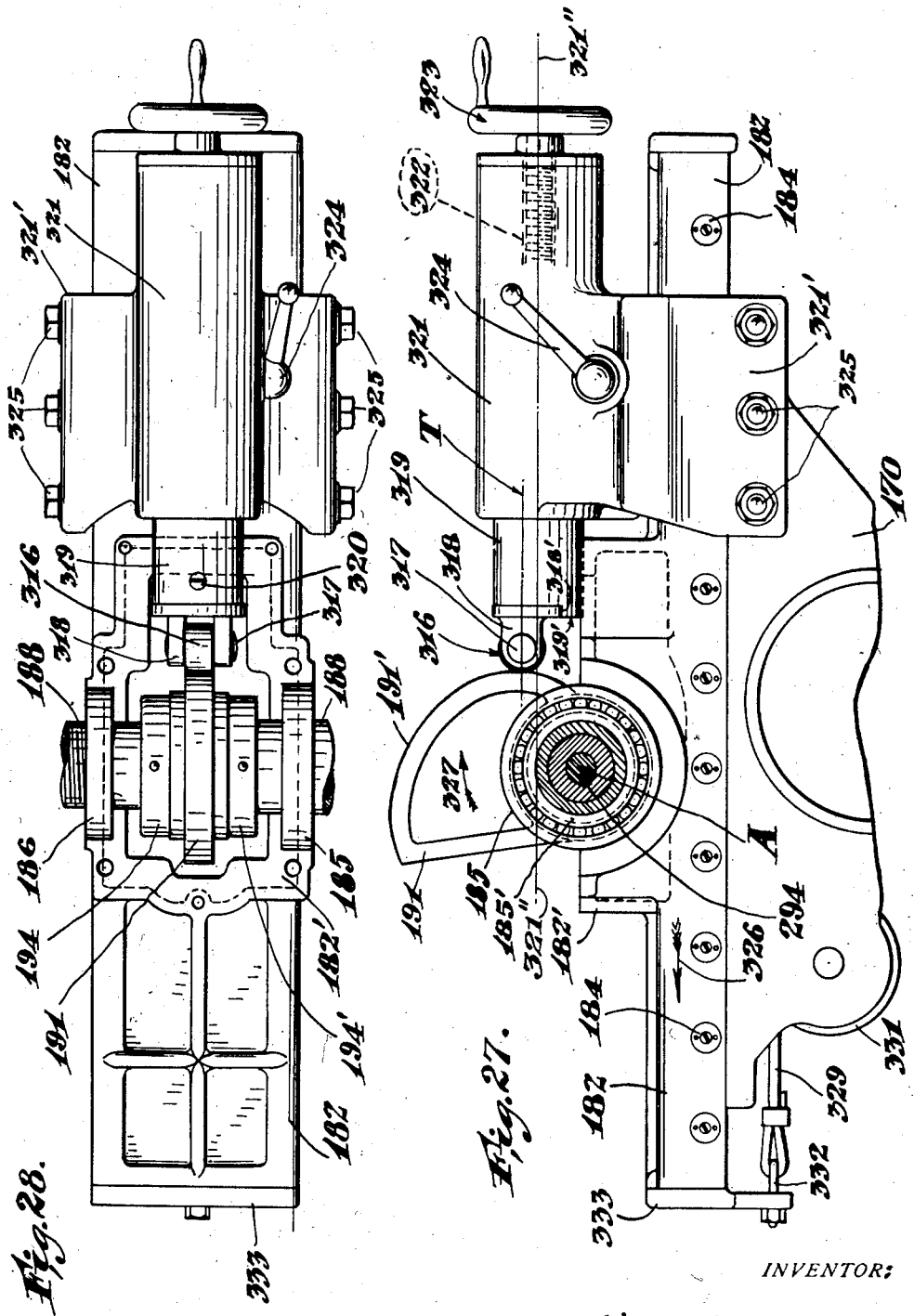

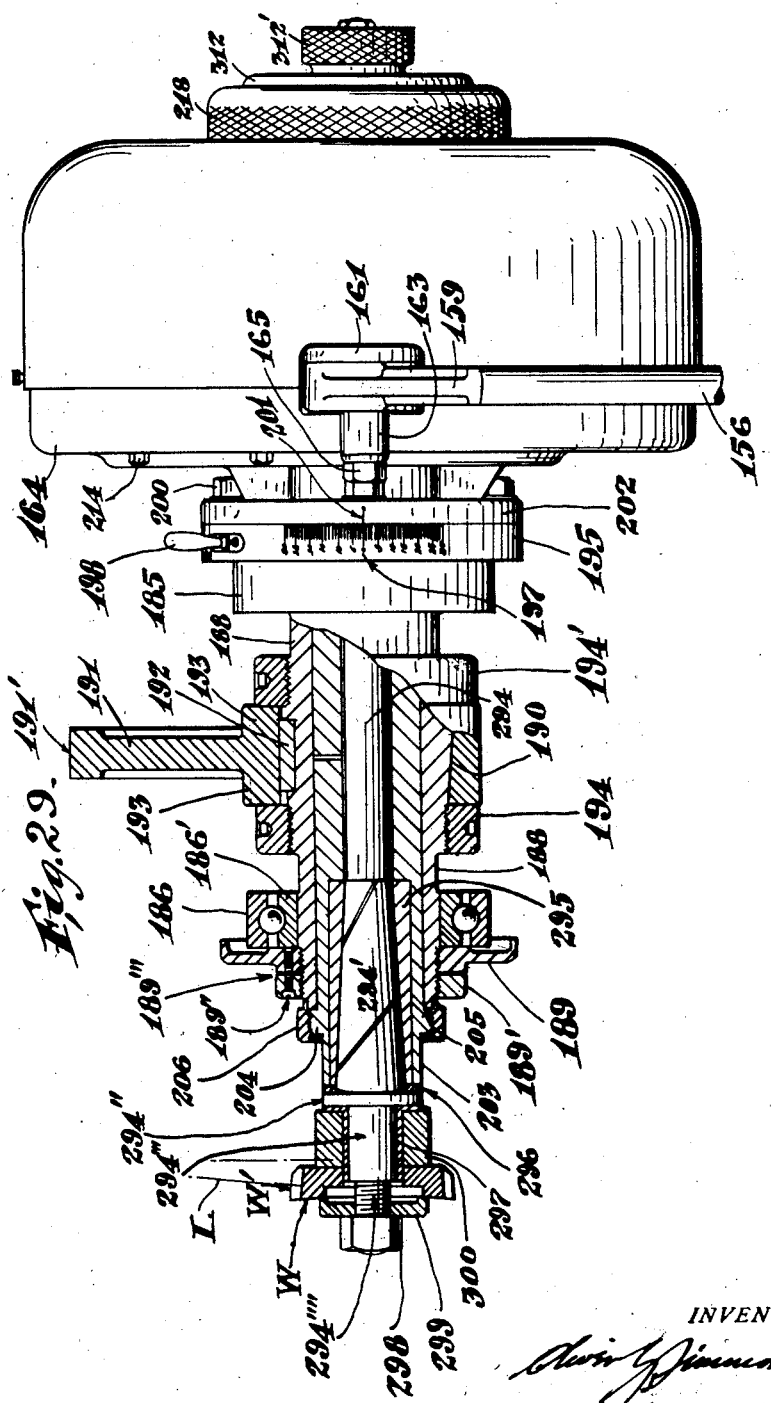

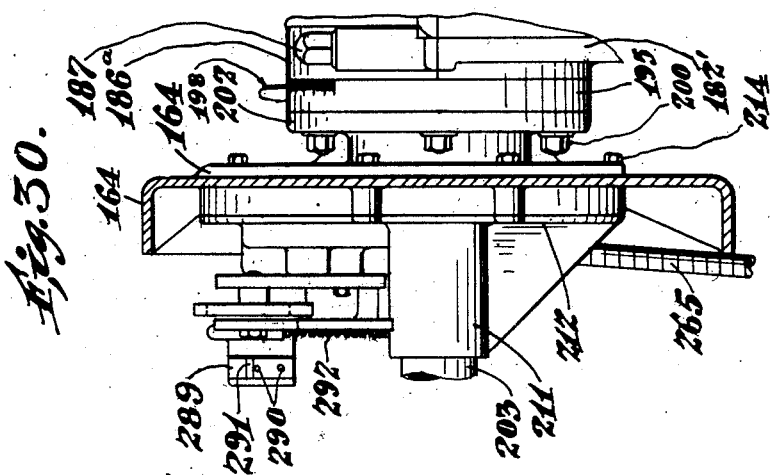
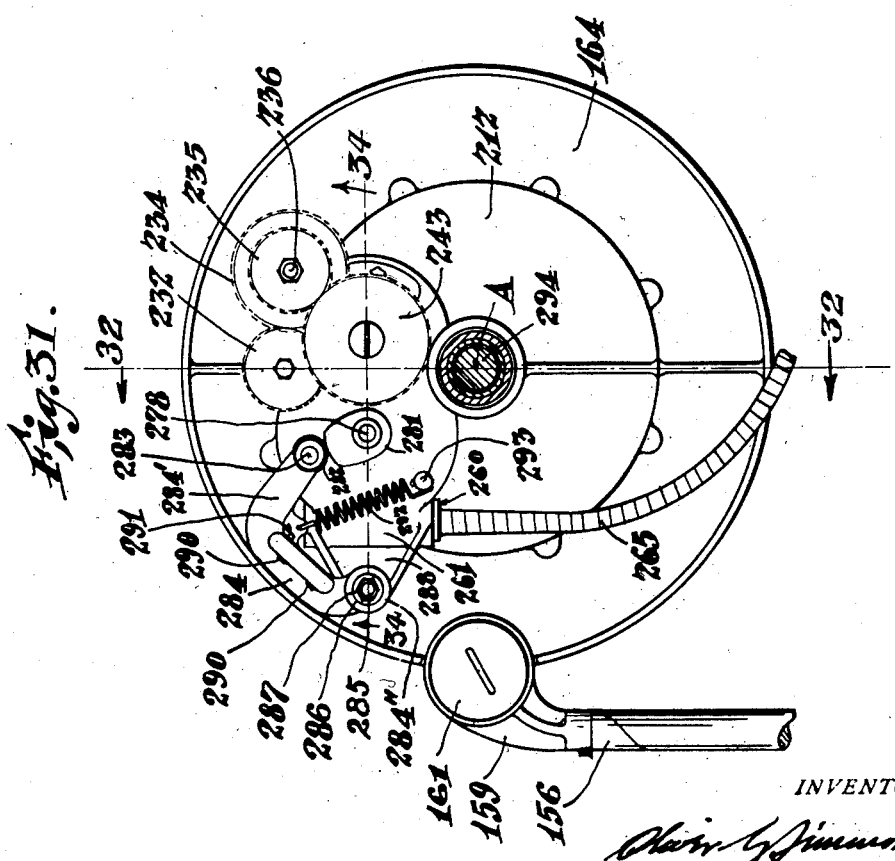

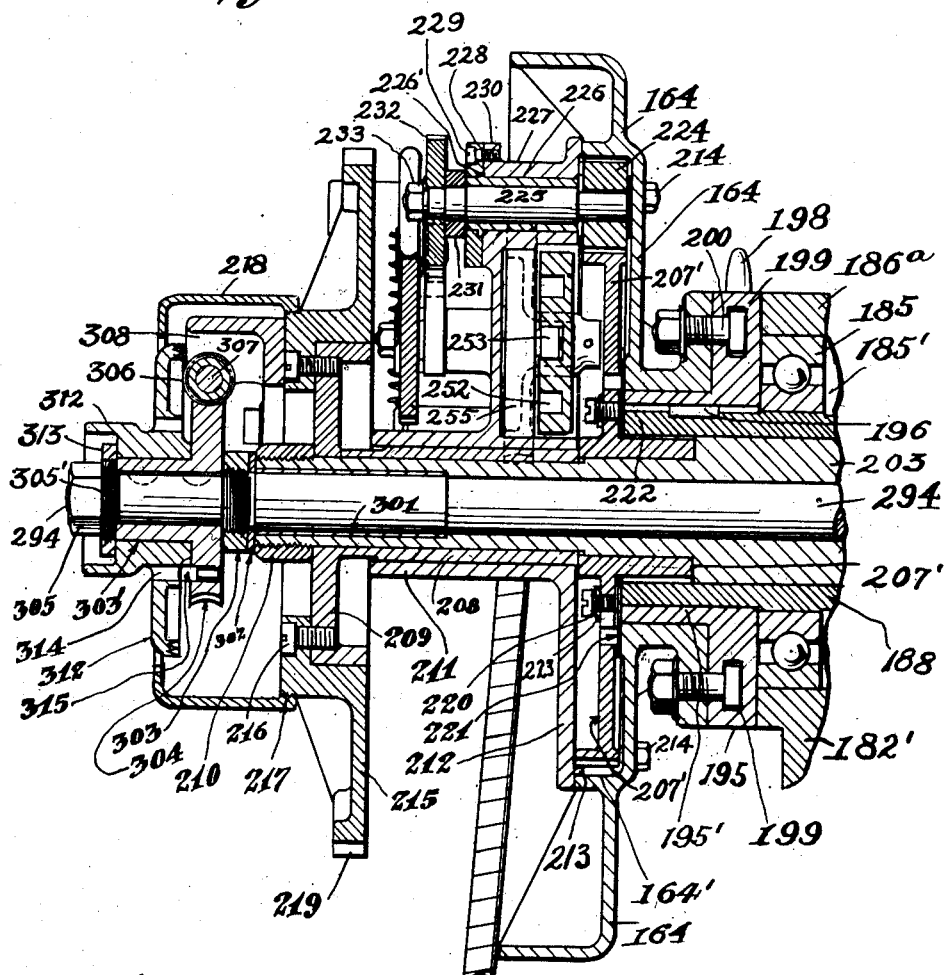

March 25, 1930.  O. G. SIMMONS  1,752,033
METHOD AND APPARATUS FOR GENERATING GEAR TEETH
Filed March 31, 1926   18 Sheets-Sheet 17

INVENTOR

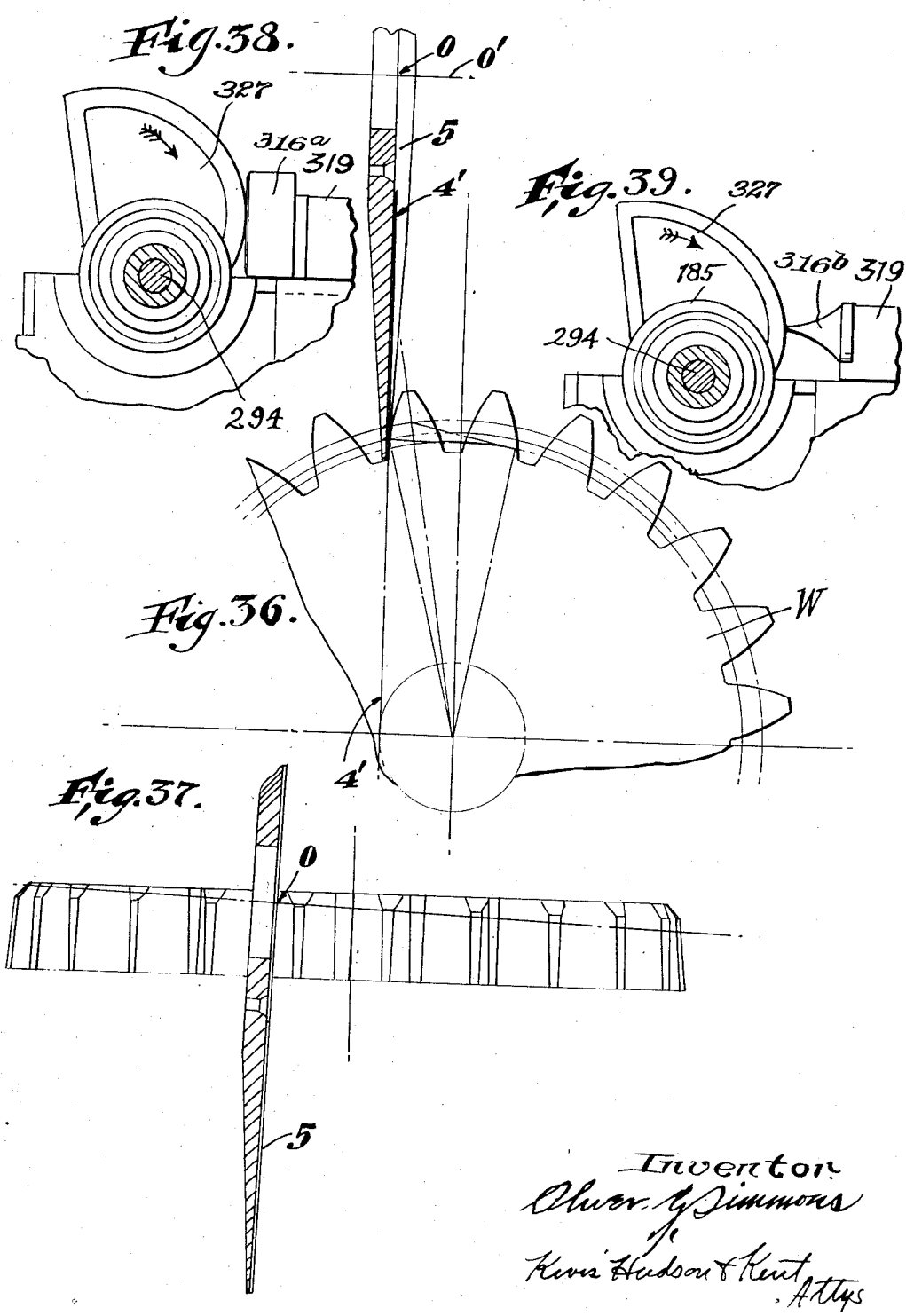

Patented Mar. 25, 1930

1,752,033

UNITED STATES PATENT OFFICE

OLIVER G. SIMMONS, OF LAKEWOOD, OHIO

METHOD AND APPARATUS FOR GENERATING GEAR TEETH

Application filed March 31, 1926. Serial No. 98,791.

My invention relates to a method of and apparatus for grinding the teeth of gears and gear shaped cutters, adapted to operate on either the describing generating principle of action, or the moulding generating principle of action to produce the true curvature of predetermined form on the teeth of gears and gear shaped cutters.

In a machine of this character, it is essential that the interrelation of the movements be correlated, positive and of precise magnitude.

One of the main objects of the present invention, therefore, is to provide a machine capable of generating the curved teeth of gears and gear shaped cutters in which the movements are of precise magnitude and correlated by positive mechanical means.

A further object of the invention is to provide a cam to actuate the work to enable the machine to operate on the describing generating principle of action to produce a curved tooth on the gear or gear shaped cutters corresponding in characteristics to the curvature of the cam.

Another object of the invention is to provide a cam to actuate the work to enable the machine to operate on the moulding generating principle of action to produce curves on the teeth of the gears and gear shaped cutters of the same general characteristics as the curve of the cam, but of greater or less magnitude as desired.

A still further object of the invention resides in the provision in a machine of the character set forth, of a spiral cam to actuate the work to enable the machine to operate on the moulding generating principle of action to produce any one of an infinite number of involute curves in the teeth of gears, gear-shaped cutters and the like.

A further object of the invention resides in the provision of adjustable means for controlling flank fullness in gears, gear-shaped cutters and the like as for example in the provision of an adjustable roller abutment for the cam.

A further object of the invention resides in the provision of means for adjusting to the complemental angle of pressure of the gear, gear-shaped cutter and the like the rectilinear path of movement of the work with respect to the cutting element.

Another object of the invention is the provision of an adjustment whereby helical teeth may be produced in gears, gear-shaped cutters and the like, such result preferably being effected by adjusting the cutting element angularly with respect to the axis of the work.

Further objects of the invention reside in the means for indexing the teeth of the gear and gear shaped cutters so that each tooth of the gear is successively operated upon to generate the parallel curved surfaces of the teeth with precision as to contour and exact duplication of the measure of the space between the teeth as measured on the base circle of the gear or gear shaped cutters; of means to actuate the cam correlated to the aforesaid indexing means; of means to cause the work to travel in a rectilinear path predetermined to produce gear teeth curvatures corresponding to the cam in the describing generating principle of action, and in accordance with the curvatures desired, with respect to the cam used in the machine, when it is adapted to operate on the moulding generating principle of action; of means to advance or retard the work independently of the indexing means; of adjustable means to remove metal from each side of the tooth of the gear or gear shaped cutters; of means to recondition the means to remove metal from each side of the teeth of the gear or gear shaped cutters; of means providing angular adjustment of the metal removing means to produce a taper as required in the practice of the invention to the teeth of the gear, gear shaped cutter or tapered gear.

With the above and other objects in view the invention may be said to comprise the method and the embodiment of the method in the structures illustrated in the accompanying drawings, hereinafter described and particularly set forth in the appended claims, together with such variations and modifications thereof as will be apparent to those skilled in the art to which the invention appertains.

Reference should be made to the accompanying drawings forming a part of this specification; wherein Fig. 1 is a front view in elevation of the machine as it is adapted to operate on the moulding generating principle of action.

Fig. 3 is an end view in elevation looking toward the left hand end of Fig. 2.

Fig. 4 is a vertical section taken on line 4—4 of Fig. 2.

Fig. 5 is a plan view of the device for positioning the cutting element spindle angularly with respect to the work spindle.

Fig. 6 is a section on line 6—6 of Fig. 5.

Fig. 7 is a full sized view of the worm and the minutes of the degree range drum shown in Fig. 5.

Fig. 8 is a side elevation of the pointer which cooperates with the degree range drum as shown in Figs. 5 and 6.

Fig. 9 is a horizontal sectional view of the cutting element spindle, showing the means for supporting the cutting element with its face in a fixed position with respect to the axis of the work spindle.

Fig. 10 is an enlarged view of the cutter truing and sharpening device.

Fig. 11 is a side elevation of the parts shown in Fig. 9.

Fig. 12 is a section on line 12—12 of Fig. 9.

Fig. 13 is a schematic view in perspective showing the belt and pulleys through which the cutter spindle is driven from a motor located in the base of the machine.

Figs. 14 and 15 (Sheet 4) are detail views showing the supports for the idler pulleys shown in Fig. 13.

Fig. 16 is a perspective view illustrating the arrangement of the members through which an oscillating movement is transmitted to the cam carrying sleeve from a continuously driven shaft.

Fig. 17 is a view in elevation of the rack shaft forming a part of the cam actuating mechanism.

Fig. 18 is a section on line 18—18 of Fig. 17.

Figs. 19 and 20 are sectional detail views showing the adjustable connection between the rack shaft and the actuating disk, Fig. 19 being a section on line 19—19 in Fig. 17 and Fig. 20 being a section on line 20—20 in Fig. 19.

Fig. 21 is a central vertical section through the worm gear and disk shown in Fig. 16.

Fig. 22 (Sheet 7) is a vertical section through the pivotal axis of the work spindle supporting bed.

Fig. 23 is a detail view showing the worm for adjusting the work spindle supporting bed.

Fig. 24 is a front elevation of the index housing connecting rod and includes a movement diagram showing the angular and linear movements imparted to the work spindle by the connecting rod.

Fig. 25 is a side elevation of the index housing connecting rod as viewed from the left of Fig. 24.

Fig. 26 (Sheet 8) is a rear elevation of the work spindle supporting bed with the dust covers in place and the work spindle, swivel bearing and crank shaft in section, the swivel member 170 being shown adjusted to an angle of 20° to the horizontal.

Fig. 27 is a front elevation partly in fragmentary section showing the cam for actuating the work spindle and the abutment with which the cam cooperates.

Fig. 28 is a fragmentary plan view of the work spindle actuating cam shown in Fig. 27.

Fig. 29 is a side elevation partly in section of the work spindle of the machine.

Fig. 30 is a fragmentary view partly in side elevation and partly in section of the index housing as viewed from the side of the work spindle opposite that shown in Fig. 29.

Fig. 31 is a view in elevation of the front of the index mechanism housing with the cover removed, the spindle being shown in section.

Fig. 32 is a section on line 32—32 of Fig. 31.

Fig. 33 is a detail view showing the worm by means of which the work spindle may be adjusted angularly with respect to the cam.

Figure 34:
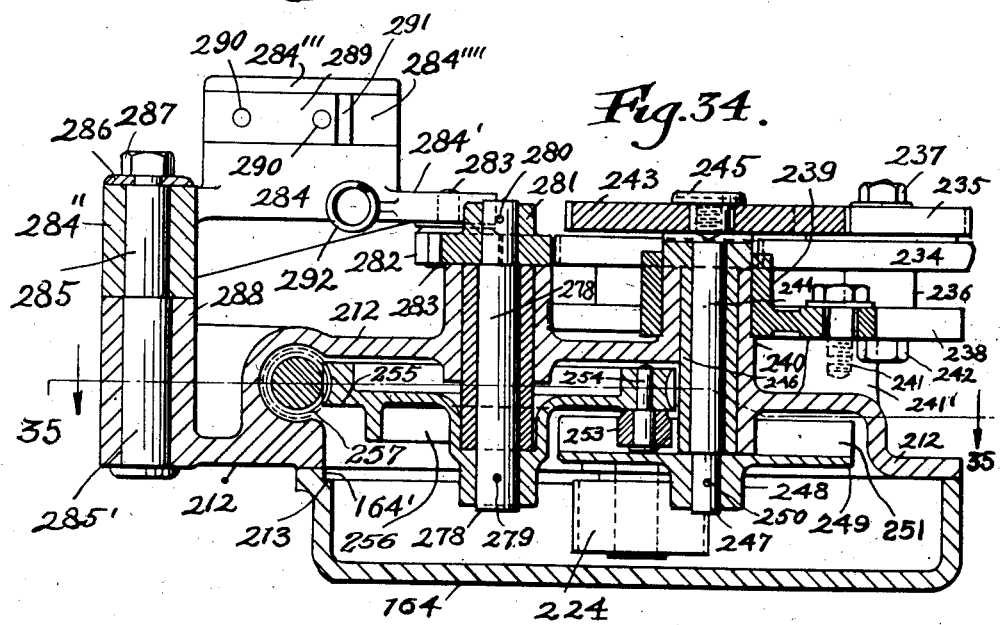

Fig. 34 is a section on line 34—34 of Fig. 31.

Figure 35:
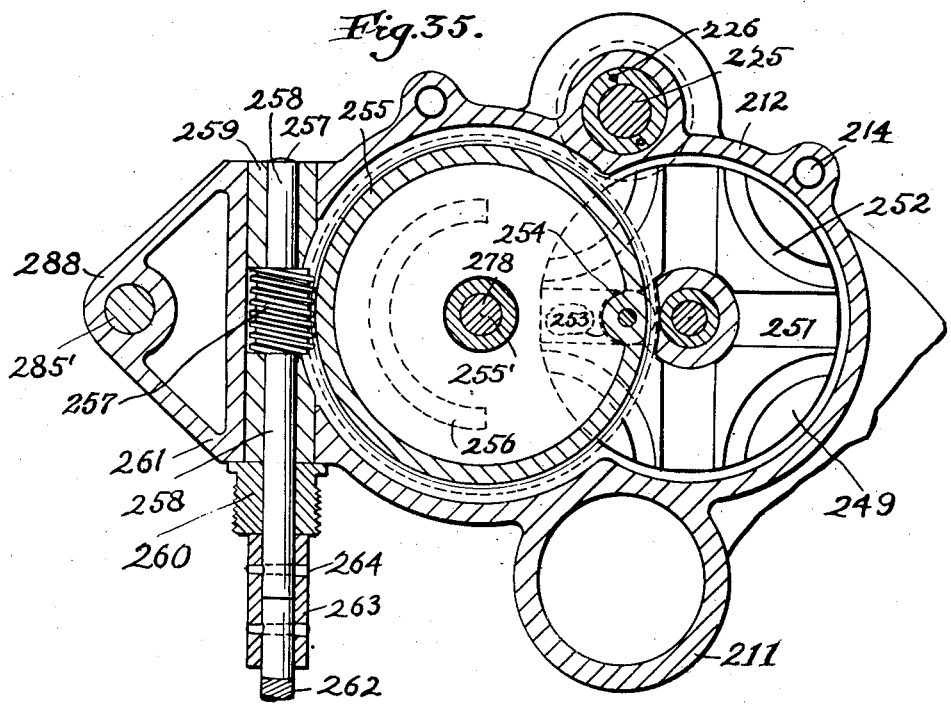

Fig. 35 is a section on line 35—35 of Fig. 34.

Fig. 36 is a diagrammatic view in which the gear shaped blank is shown in side elevation and the cutting element is shown in section in the position with respect to the blank which it occupies when removing metal from the face of a tooth.

Fig. 37 is a plan view of the cutting element and blank shown in Fig. 36.

Figs. 38 and 39 show modified forms of cam and abutment, Fig. 38 showing a plane face abutment adapted to replace the roller abutment, and Fig. 39 showing a cam having a spiral face formed on a curve other than an involute and a point abutment cooperating therewith.

If a plane surface be given a continuous rotary movement about a given axis, and a member having a point contact with the surface, be given a continuous movement along a fixed path, i. e., along a straight line or given curve, so that the point in contact with the surface gradually approaches or recedes from the axis of rotation, the curve traced by the point upon the surface will be one of the many curves included in the general class known as spirals.

If the point be moved at a uniform rate along a radius of the uniformly rotating blank, the curve generated will be the spiral of Archimedes which has a constant lead along a radial line. If in generating the curve in this class, the point is moved over the rotating blank at a uniform rate, along a straight line other than a radial line, the curve generated will be one of a general class of spiral curves which includes the involutes of circles; all curves of this class being characterized according to the Simmons Law of the Involute, in that they have a uniform lead along a line tangent to the circle in which the curve has its origin. If the lead between spires along the tangent line be equal to the circumference of the circle of origin, in this case the evolute, the curve will be the involute of the circle.

It is to be understood that the term spiral is used herein in a generic sense and not as commonly employed to designate the Archimedian spiral and that the two classes of spiral curves herein specifically mentioned are but illustrations of various spiral curves which may be employed.

Heretofore in machines for generating the involute curved surfaces of the teeth of gears, gear shaped cutters and the like, the rolling action between the cutting element and the work, likened unto the action between a pinion and rack, has been controlled by various means with indifferent results.

The main objection in previous machines for generating the involute curved surfaces of the teeth of gears, gear-shaped cutters and the like has been that the motion imparted to the cutting element and the work has lacked precision and lacked absolute uniformity with the result that the toothed surfaces of the work or the surfaces of the cutting element or both have been ruined. The combined magnitude of the errors inherent in such machines has been greater than those tolerated in the commercial product.

Commercial tolerance limits of accuracy for ground automobile transmission gears, as this is written, are substantially plus or minus three ten thousandths of an inch, for each of the gear tooth elements above cited.

The tendencies of the authorities lean toward still smaller tolerance limits of error. It appears to remain only for the commercial advent of a machine capable of producing gears, to smaller limits of error, to have the smaller limits established.

Interchangeable mass production essentially depends upon the greatest attainable accuracy.

The tolerance limits of accuracy, for many commercial size gear shaped cutters, as this specification is being prepared, is substantially plus or minus one ten thousandth of an inch.

A battery of machines constructed in accordance with my present invention, are producing commercial gears and gear shaped cutters, with a tolerance limit of error of plus or minus .0001 inch for each of the tooth elements above referred to.

The inherent accuracy of the apparatus embodying the method, as determined from the battery of machines heretofore constructed, is substantially within an error of plus or minus .000041 inch. In many instances where specially accurate gears and gear shaped cutters have been desired, they have been produced to an accuracy of plus or minus of .00005 inch. This accuracy closely approaches the ultimate accuracy, as stated above.

The accuracy of the gears and gear shaped cutters above referred to, is made possible by virtue of the method and apparatus herein disclosed.

The accurately made involute cam, of large dimension, with respect to the teeth of gears and gear shaped cutters, is easily obtained, having an ultimate accuracy, covering the involute curve from its point of origin on the base circle, to the outer extreme end of the cam, of plus or minus .0001 inch from the true involute curve.

The portion of the curve of the cam actually used while the cutting element is performing on a tooth of the work is relatively small. This produces a correspondingly smaller error on the tooth of the work, and as will later appear this small error can be compensated for and eliminated, in so far as the cam is concerned, by swiveling the slide carrying the cam, to a slightly less or slightly greater angle, which will later be seen is simply decreasing or increasing the pressure angle setting of the machine. It will later be pointed out that as the same cam abuts the same roller through every cycle, all the teeth of the work are easily maintained to the given contour and that the error above stated, with respect to the tooth form in the work, is uniform on every tooth being operated on, and is dependent upon, first; the keenness of the cutting element, and, second; the pressure of the face of the teeth of the work against the cutting element. Each of these conditions is controllable by the operator, and since the machine functions without the slightest trace of vibration or jerkiness, which as pointed out previously is very objectionable, it is therefore, a very simple matter to continuously, in a commercial way, produce cutters and gears of extreme accuracy.

The absence of jerkiness or vibration in the apparatus, it is believed will be later obviously understood to be due to the method, and the embodiment of the method in the apparatus, by which the cam is fixedly secured to the work carrying sleeve to which also is fixedly secured the index housing which is actuated by a connecting rod journaled to the outermost point of the index housing, remote from the axis of the sleeve.

This connecting rod, at the working end of the stroke is on dead center and in the neutral state, in so far as stress is concerned, whereas, in other types of machines, the greatest stress is encountered at the end of each stroke.

The numeral 1 indicates the base of the machine within which, not shown, are mounted two small electric motors as a source of power for operating the mechanism as will be later described.

The numeral 1' indicates doors in the base of the machine; said doors being provided with wire screening to provide air ventilation for the motors located within said base.

The bed 2 is securely mounted on the base 1 in the usual manner of machine tool construction.

*Cutter supporting and adjusting means*

Upright swivel base 3 is mounted on the upper portion of the bed 2, one end of which contains a pivot represented as a shoulder 4, journalled in the upper portion of the bed 2. (See Fig. 3). The axis 4' of oscillation of the pivot shoulder 4, is also the median line coinciding with the plane of the face of a cutting element 5 and intersects at O, the axis O', of the cutting element spindle. See also Figs. 9 and 36.

The cutting element 5 may be in the form of an abrasive wheel, if the material to be removed has been hardened, or in the form of a milling cutter, if the material to be removed is in the soft state, that is, unheat-treated.

The other end of the swivel base 3, see Figs. 5 and 6, is provided with a segment of a worm wheel 6, in which, if there were a full circle, there would be 720 teeth, adapted to mesh with the threads of a worm shaft 7, which is journaled in the bearing boxes 8 and 9 fixedly secured to the top of the bed 2 by means of the screws 10.

The other end of the worm shaft 7, has secured thereto a minute range drum 11, which is provided with a helical groove 12, having a pitch corresponding to the pitch of the threads of the worm shaft 7. The right hand end portion of the minute range drum 11, is provided with a knurled extension 13, which is adapted to be grasped in the hand and be rotated for a purpose to be described later.

A projection 14, of the bearing box 9, has securely mounted therein a pointer shaft 15, adapted to carry a pointer 16 along pointer shaft 15. The pointer 16 is provided with an arcuate wing 17, in the upper and lower portions of which are secured keys 18, which project through the wing 17 and engage the helical groove 12 of the minute range drum 11. The surface of the range drum 11 is graduated longitudinally thereof with 30 divisions to the circle. The median one, indicated by the numeral 19, is located approximately in the middle portion of the range drum and graduated with a naught. Taking this as zero, each fifth line is graduated 5, 10, 15 and so on, to the opposite ends of the drum. Each division, therefore, is one minute of a degree, so that if the knurled extension 13 be rotated, the swivel base 3 will be caused to move about the pivot axis 4' to any predetermined angle within a direct reading range of the minute drum 11. As the drum is rotated, the pointer 16 is caused to move along the shaft 15, and when the line 20, on the wing 17, coincides with the desired line on the drum, the setting is effected and bolts 21 may be tightened to secure the swivel base 3 to the bed 2.

The upper surface 6' of the worm wheel segment 6 is graduated in quarter degrees to a maximum of 5° on each side of zero. The top of the box bearing 8, is provided with a line stamped "Zero," coinciding with the zero line of the graduated surface 6', when the line 20 of the circular wing 17, coincides with zero on the minute range drum 11. The graduations on the surface 6' are to enable the operator to quickly determine by inspection approximately the angular setting of the swivel base 3, and more accurately to the exact minute by means of visual inspection of the minute drum 11.

It is of the utmost importance that the cutting face of the member 5 be set at the correct angle with respect to the axis of the work, whether the work be a gear or a gear shaped cutter. In the case of the gear it is highly important that the sides of the teeth be parallel to the lowest possible infinitesimal error. This statement is predicated upon the assumption that there is nothing perfect if craftsmanship enters into it as it does in this case. In the case of the gear shaped cutter it is necessary that the cutting member 5, be set at the correct angle to the cutter axis with equally as great precision as referred to with respect to the parallel faces of the teeth of the gear.

The top of the swivel base 3, is provided with V-ways 22, to which is adapted to be slidingly connected an upright 23. (See Figs. 3 and 4.)

The upright 23 is adapted to be moved on the V-ways 22 longitudinally thereof, that is to say, toward or away from the pivot axis 4' by means of a screw 24, having threaded engagement with nuts secured to the swivel base 3. The outer end of said screw 24 has secured thereto a graduated hand wheel 25, and interposed between the hand wheel 25 and a shoulder of the screw 24, is an extension bearing 26 fixedly secured to the lower portion 27, of the upright 23. (See Fig. 1.)

By rotating the hand wheel 25, therefore, the upright 23 is moved toward or away from the pivot axis 4' of the pivot 4 of the swivel base 3.

The face of the upright 23 is provided with V-ways adapted to receive the V-ways 29 of a slide 28 which carries the cutting element 5. (See Fig. 9.)

Figure 1:
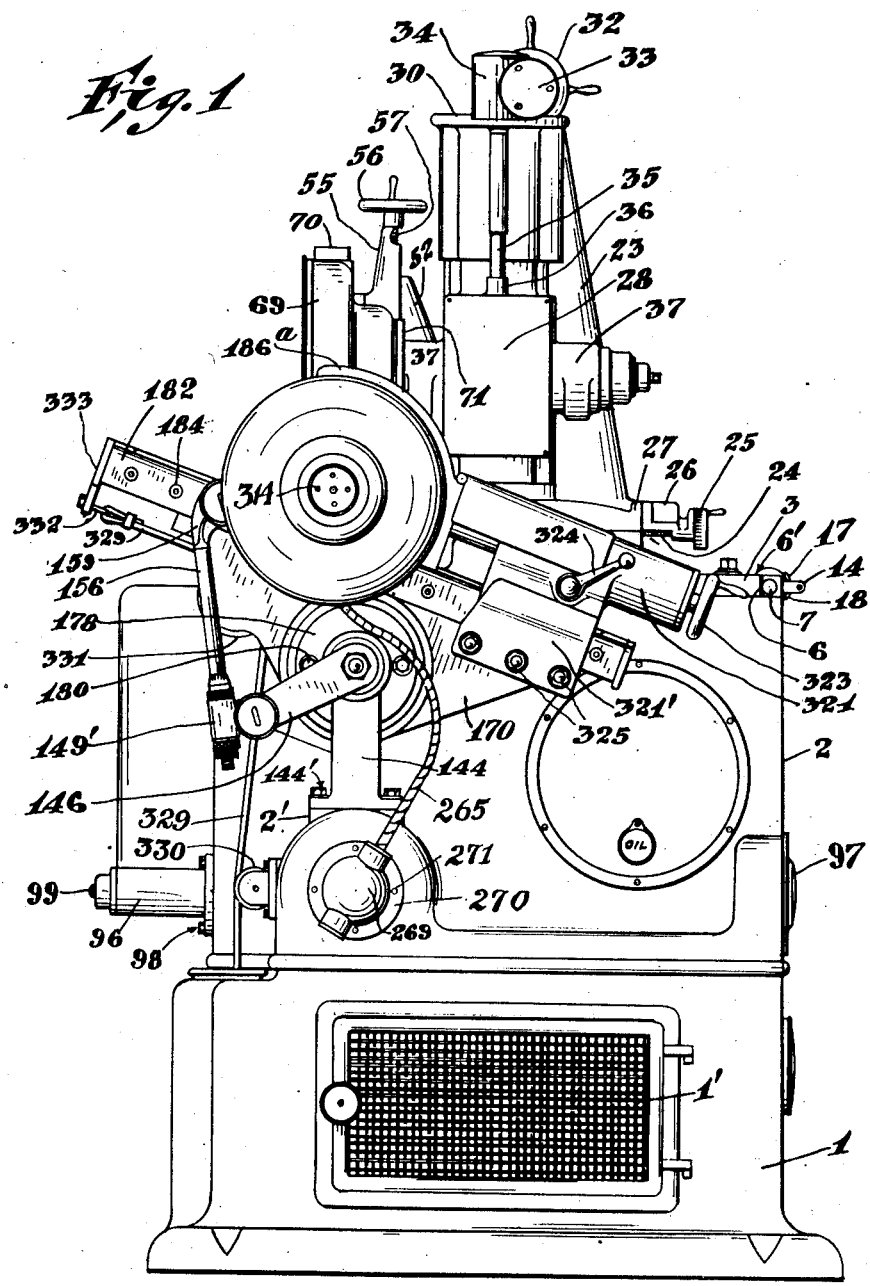
Figure 2:
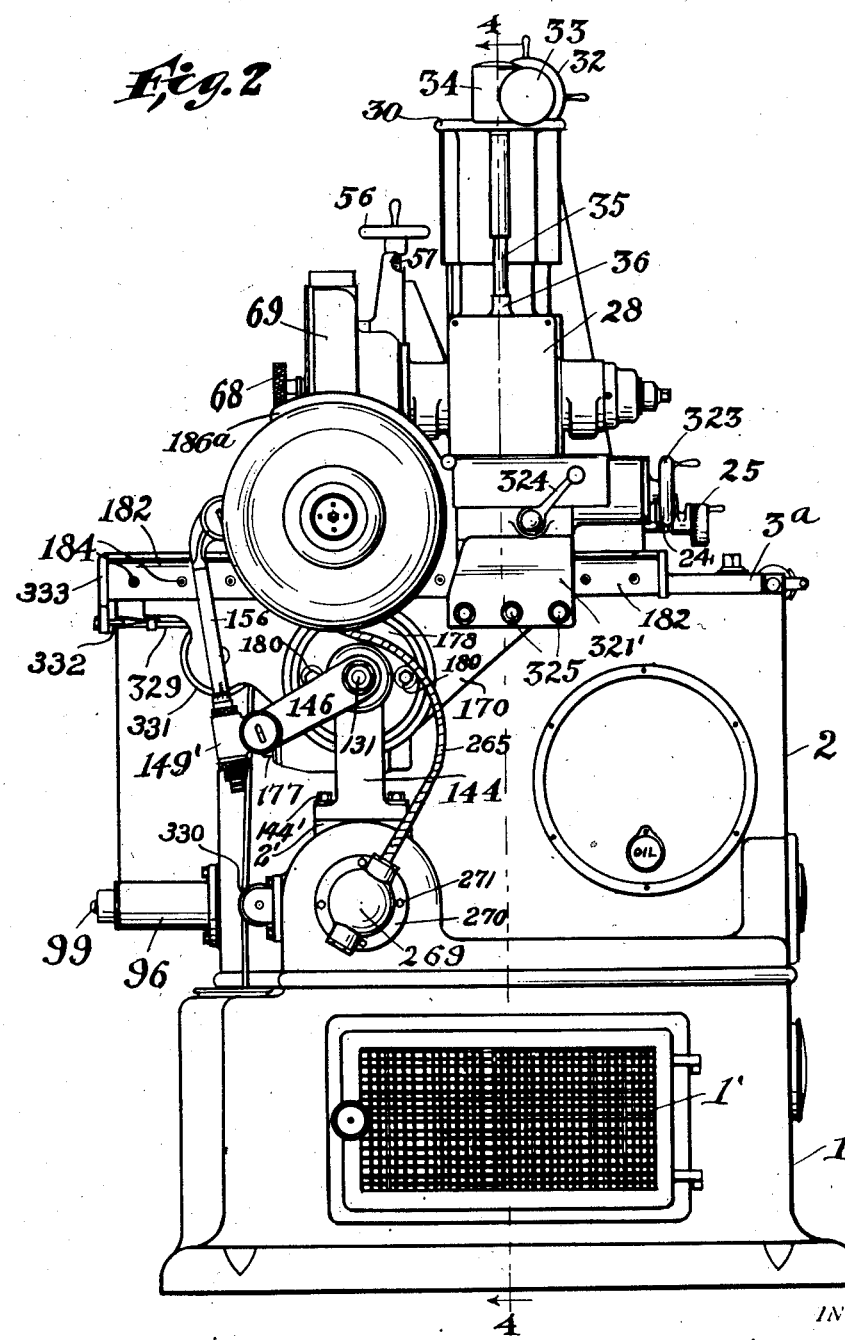
Fig. 2 is a front view in elevation of the machine as it is adapted to operate on the describing generating principle of action.

A bracket 30, Figs. 1, 2 and 3, is fixedly secured to the upper portion of the upright 23. This bracket carries a shaft 31 journaled therein, one end of which is provided with a hand wheel 32, the other end of which is provided with a spiral gear fixedly secured thereto, said spiral gear being located inside of the casing 33 and adapted to engage the teeth of a mating spiral gear inside the casing 34, the last mentioned spiral gear being fixedly secured to the upper portion of a screw, the threads of which engage a nut carried in the upper portion of a tube 35; the lower portion of which tube is fixedly secured to a boss 36 on the upper portion of the slide 28.

By rotating the hand wheel 32 in one direction, the slide 28 may be moved upwards and if rotated in the opposite direction, the slide will be moved downwards. The amount of movement may be as required in practice.

On each side of the slide 28 are bearing boxes 37 adapted to receive bearings 38, as shown in Fig. 9, in which is journaled the cutting element shaft 39, on which intermediate said boxes is a driving pulley 40, fixedly secured to said shaft, as for example, by means of set screws 41 diametrically opposite. The bearings 38 being split and tapered as shown, are adjustable by means of nuts 42. The hub 43 of a flange 44 is fixedly secured to and abutting against the shoulder of the shaft 39 by means of a washer-up 39' having threaded engagement with the reduced portion of the shaft 39 and, interposed between the face of the hub 43 and the outer end of the bearing 38, is a thrust ball-bearing 45, and a similar thrust ball-bearing 45' on the other end, the outer face of which is in permanent contact with a spring cup 46, adapting it to receive one end of a coil spring 47, the other end of the coil spring 47 being seated in a cup bushing 48, which is fixedly secured to a small portion 49, of the shaft 39, by means of a nut 50. The usual oil well is provided in this arrangement and ring oilers are used in each bearing, details of which are well known to those skilled in this art.

It is important that the cutting element 5, which is secured to the flange 44 in any suitable manner, preferably by means of the screws 51, be rotated without vibration in a single plane.

The mechanism herein provided as described has been found to give very excellent results. The shaft 39 rotating freely in the bearings 38, is revolved about a fixed axis O'—O' in a single plane and maintained by means of the spring 47, which keeps the hub 43 at the flange 44 constantly against the ball-thrust washer 45. Any expansion of the shaft 39 due to heat is compensated for by means of said spring 47.

In precision work of this character it is important that there be no end play, that is to say, axial movement of the cutting element 5. A bracket 52, see Figs. 3 and 9, is secured to the swivel base 3 preferably by means of bolts 53, which have threaded engagement with suitable tapped holes in said base. The bracket 52 is maintained in perfect alignment by means of a key 54, see also Fig. 4. A slide 55 is gibbed to the upper portion of the bracket 52, and is adapted to be raised or lowered as is found necessary in practice by means of a hand wheel 56, which is secured to a screw 57, see Figs. 1 and 4, said screw having threaded engagement with a nut in the upper portion of said bracket 52.

*Cutter sharpening or dressing means*

A diamond slide 58 is secured to the slide 55 by means of bolts 59 substantially at right angles thereto. The diamond slide is provided with a cylinder 60, and journaled therein is a rack shaft 61, see Fig. 12, at the outer end of which is located a diamond holder 62, which is secured to the rack shaft 61 by means of a clamping screw 63. The diamond point 62' at the end portion of the holder 62, is shown in Fig. 10 as in contact with the face of the cutting element 5. This has been done to illustrate the position of the point of the diamond 62' with respect to the face of the cutting element 5, and as shown is in its working position in which it is used to sharpen the metal removing face of the cutting element 5, it being understood that in this particular example, the cutting element 5 may be one of the many forms of abrasive grinding wheels, which are adapted to be sharpened or dressed by means of a diamond as understood by those skilled in this art.

The cutting point of the diamond 62', therefore, in this practice of my invention, is adapted to maintain the face of the cutting element 5 in the plane of the vertical axis 4', previously referred to. As the cutting element wears away it is moved by means of the hand wheel 25 and screw 24 of the upright 23, into cutting engagement with the point 62' of the diamond. The diamond is then moved across the working portion of the face of the cutting element 5, by means of the mechanism now to be described.

The lower portion of the rack shaft 61 is provided with teeth 64, adapted to engage the teeth of a pinion 65 integral with a shaft 67, to the outer portion of which shaft is secured a thumb wheel 68. By rotating the wheel 68 the diamond is moved across the face of the cutting element 5 the desired distance and is returned to the rest position shown in Fig.

3, which is out of contact with the cutting element 5.

A suitable dust guard 69 as best shown in Figs. 1 and 3 is provided which surrounds the cutting element 5, the upper portion of which dust guard has a spout 70 adapted to receive the end of a vacuum pipe which carries the dust from the lower portion which as shown is open. The dust guard 69 is secured to a flange 71 on the slide 28 at the rear of the grinding wheel, (see Fig. 9), by means of suitable screws which pass through holes in the dust guard 69 and engage threaded holes 72 in said flange.

*Cutter driving means*

The shaft 39, see Fig. 13, is adapted to be rotated at suitable speed by means of an endless belt 73, which as shown in said view, semi-encircles the face of the pulley 40, passes over the face of idler pulleys 74 and 75 which are maintained in fixed relation with respect to the pulley 40. The endless belt 73 then passes over a pulley 76 and over idlers 77 and 78; thence to the motor pulley 79 located in the base 1 of the machine.

As shown in Fig. 13 the face of the pulleys 74, 75, 76 and 79, on the pull side of the belt 73, represented by the arrow 80, are in line, so that, as the shaft 39, carrying the pulley 40; shaft 81, carrying the pulley 74; and shaft 82 carrying the pulley 75, are moved as a unitary part with the slide 28, the tension on the endless belt 73 will remain constant because of the alignment referred to.

The pulley 76 is suitably mounted on a shaft 83 which is secured in the upright 23 at the upper portion thereof. Pulley 77 is suitably mounted on a shaft 84 which is journaled in a small bracket 85 secured to the inner surface 86 of the swivel base 3, by means of bolts 87 as shown in Fig. 14.

Pulley 78 is suitably journaled on a shaft 88 which is carried by a bracket 89, secured to the lower surface 90 of the bed 2 by means of bolts 91 as shown in Fig. 15.

The pulleys aforesaid are flanged, as will be understood by those skilled in the art, enabling the endless belt 73 to operate properly within the swivelling range of the swivel base 3.

*Main driving elements for work and work spindle carriage*

The drive shaft 92, see Fig. 16, is adapted to be rotated on suitable ball bearings 93, 94 and 95, said bearings being housed within housings 96 and 97 which are secured to bed 2 by any suitable means; for example, bolts 98, see Fig. 1. The left end of the drive shaft 92 is provided with a square section 99, adapting it to receive a commercial crank handle, not shown, by which the operator is enabled to rotate the shaft 92 by hand for test of set-up as will be later described. The shaft 92 is driven from a motor located in the base 1 of the machine.

A silent chain 100 having tooth connection with the sprocket mounted on the shaft of said motor and the teeth of a sprocket 101, shown in Fig. 16, sprocket 101 being securely fixed to the shaft 92, will cause said shaft 92 to be rotated by the motor referred to. A worm 102 is fixedly secured to said shaft 92, the threads of which worm engage the teeth of a worm wheel 103 which is securely fastened to a shaft 104, which shaft is journaled by means of suitable ball-bearings 105 in an eccentric flanged housing 106, see Fig. 21; this housing 106 being clamped to the innner wall 107 of the bed 2 by means of bolts 108 and a ring flange 109.

A shoulder 110 of the housing 106 is the portion which is eccentric to the axis of the shaft 104, so that if said housing 106 be rotated slightly, the teeth of the worm wheel 103 will be caused to engage more snugly the threads of the worm 102. In this way all back lash between the teeth of the worm and the worm wheel may be eliminated by means of the adjustment just described.

To the left end of the shaft 104 is securely fastened a crank-disc 111, see Figs. 17, 19 and 20, on the face of which is mounted a crank pin 112, which engages a T-slot 113 of the crank-disc 111, see Figs. 19 and 20.

A ball bearing support 114 is mounted on the crank pin 112 and is adapted to carry ball bearings 115, which are carried by a ball-casing 116 which forms the crank end of the rack shaft 117, being fixedly secured thereto by means of a taper pin 118. The stroke of the rack shaft 117 is, therefore, adjustable within the range of 60° to 90° of arc movement as will be later referred to. A zero line 119 is scribed on each side of the bearing support member 114, so that when this line coincides with any one pair of the lines 120, graduated on the face of the crank-disc 111, it will cause the rack-shaft 117 to move in accordance with said adjusted setting. The rack-shaft 117 reciprocates in a member 121, which is adjustably secured to side supporting members 122 and 123, by means of an eccentric bolt 124 and an engaging nut 125, the intermediate section 126 being eccentric to the annular portions 127 of said bolt, so that when the bolt is slightly rotated the portion 126 fitting snugly in the hole of the part 121, will cause said part to move in or out, dependent upon the direction of rotation of the bolt.

The upper portion of the rack-shaft 117 is provided with teeth 128, which are adapted to engage teeth 129 of a sector gear 130, which is securely fastened to the oscillating shaft 131, upon which shaft are mounted ball bearings 132 and 133, one on each side of the sector gear 130, the ball bearings being housed in the side members 122 and 123 said members being clamped at the upper portion thereof by means of bolts 134.

The ball bearing 132 is clamped by means of a cover 135 which is secured to the member 122 by means of the screws 136. In a similar manner the outer race of the ball bearing 133 is secured to the member 123 against axial movement by means of a clamping cover 137, adapted to be secured to member 123 by means of screws 138, see Fig. 18.

Adjacent the ball-bearing 132, see Fig. 22, is mounted a ball bearing 139, the outer race of which bearing is mounted in a flange 140 which is secured to the inner wall 107, of the bed 2, by means of bolts 141.

A ball bearing 142 is mounted on the shaft 131 at substantially the middle thereof, the outer race of said bearing being secured to the left end 143′ of a swivel bearing 143; said shaft continuing on through the swivel bearing 143, being journaled in an arm member 144, at the right side thereof, by means of a ball bearing 145. The left side of the arm member 144, see Fig. 22, is counter-bored to receive the nose 143″ of the swivel bearing 143, the lower portion of which arm member is secured to a pad 2′, of the bed 2, by means of bolts 144′, see Figs. 2, 3 and 4.

Crank arm 146 is secured to the shaft 131, adjacent to ball bearing 145, by means of the Woodruff key, washer and nut shown on the drawing which is the usual practice. As shown in Figs. 24 and 25 the other end of the crank-arm 146 carries a pin 147 securely fastened thereto, the outer portion of which pin carries the inner race of a duplex ball bearing 148, the outer races of which are secured in a casing 149, by means of a cap 150 having threaded engagement with said casing 149, and the inner races of which are secured to the crank pin 147, by means of a washer and nut 151, having threaded engagement with pin 147.

The end portion 149′, of the casing 149, is a bearing adapted to receive a micrometer barrel 152 which is secured against end-play therein by means of a nut 153, having threaded engagement with the end portion of the micrometer barrel 152. The end portion 154 of the micrometer barrel 152, is tapered and graduated as shown, 50 divisions to the circle, corresponding to the internal threads of the micrometer barrel 152 as of twenty to the inch, engaging threads 155 of an index connecting rod stem 156. A jam-nut 157 engaging the threads 155 of the index connecting rod stem 156, may be revolved to lock the micrometer barrel 152 and the connecting rod stem 156, making a unitary part.

The stem 156 is graduated as indicated by the numeral 158 for a purpose to be later described, in connection with the divisions indicated by the numeral 154. To the upper portion of the stem 156 is secured a ball bearing housing 159, which is adapted to receive the outer race of a ball bearing 160, being secured to said housing 159, by means of a cup 161, having threaded engagement therewith. The inner race of the ball bearing 160 is carried by a pin 162 and secured to lug 163 of an inner index housing member 164, by means of a washer and nut 165, with which the pin has threaded engagement.

If the jam-nut 157 is free and the micrometer barrel 152 revolved, the center distance of the index connecting rod as a whole will be increased or decreased, depending upon which way the micrometer barrel 152 is revolved, and the measure of said increase or decrease may be accurately determined by means of the graduations 154 of the micrometer barrel 152 and the graduations 158 on the stem 156. Each turn of the micrometer barrel 152 will represent one twentieth of an inch, or fifty thousandths of an inch, and inasmuch as the graduations 154 are in the order of fifty to the circle, each graduation or division will represent a difference of one thousandth of an inch.

Referring to Fig. 16 it will be observed that as shaft 92 revolves it will drive shaft 104, causing the rack-shaft 117 to reciprocate in and out of bearing 121 shown in Fig. 17. The teeth 128 of the rack engaging the teeth 129 of the sector gear 130, will cause it to rotate a fractional part of a circle and to return to the starting point for every revolution of the crank-disk 111. This causes the shaft 131 to oscillate to and fro and this oscillating movement is transmitted to the inner portion 164 of the index head, see Figs. 24 and 25, through the connecting rod stem 156. Referring to Fig. 24, three positions of the connecting rod are illustrated. One position is shown in full lines and the other two are shown in dotted lines. An infinite number of positions could be shown, but the three selected are representative and will serve for the purpose of a further detailed description to follow later. For the present, therefore, it may be said that if it is desired, for any reason to lengthen or shorten the stroke of the connecting rod, it may be accomplished by adjusting the crank pin 112 on the crank-disc 111, shown in Fig. 17, and if, for any reason, it is necessary to alter the position of the inner portion 164 of the index head, with respect to the crank-arm 146, it may be accomplished by means of the micrometer barrel 152 as described.

*Work spindle support*

Referring to Fig. 22 the swivel bearing member 143 is provided with a projection 166 and a flange 167. The projection 166, see Fig. 3, serves to centrally locate the swivel bearing member 143 with the bed 2. The flanged portion 167 abuts against the face of said bed 2 and is secured thereto by means of fillister head bolts 168. The peripheral portion of the flange 167 is graduated in degrees as shown at 169 (Fig. 3) for a purpose to be later described.

A swivelling member 170, see Figs. 2, 3, 22 and 26, is journaled on the member 143 and is provided with a flange 171, the peripheral portion of which is provided with a vernier 172, so graduated that, in combination with degree divisions 169, it provides means by which said swivelling member 170 may be set at an angle with respect to the degree graduations 169, in multiples of five minutes. To enable the swivelling member 170 to be angularly adjusted about the swivel bearing 143, there are preferably provided worm wheel teeth 173, see Figs. 22 and 23, generated on the surface of said swivel bearing as shown. These teeth are adapted to engage the threads of a worm 174 formed integral with a shaft 175, each end of which is journaled in the lower portion 176 of said swivel member. The left end of the shaft 175 is rectangular in shape as indicated by the numeral 177, adapting it to receive a commercial crank handle, not shown.

A flange 178, see Figs. 2 and 22, is loosely journaled on an enlarged portion 179 of the swivel bearing nose 143" and is adapted to clamp the swivel member 170 against the flange 167 of the swivel bearing by means of bolts 180 having threaded engagement with the end wall 143''' of the swivel bearing 143, as indicated in Figs. 2 and 26.

The upper portion 181 of the swivelling member 170, see Figs. 3 and 22, is provided with V-ways adapting said swivelling member to accommodate a slide 182, the lower portion of which is provided with complemental V-ways and a gib 183, said gib being adjusted by means of gib screws 184, as shown in Figs. 1, 2 and 27 in the manner well known in the art, and for the usual purpose of maintaining the rectilinear bearing between the slide 182 and the upper portion 181 of the swivel bearing 170. The slide 182 is provided with an upper box shaped portion 182' adapted to receive the outer rings of ball bearings 185 and 186 as shown in Fig. 28, said ball bearing rings being located transversely of the longitudinal axis of the slide 182, and secured to the box portion 182' thereof, by means of an upper bearing cover 186ª, see Fig. 26 held in place by bolts 187 and 187'.

Mounting of work shifting cam

The inner rings 185' and 186' of the ball bearings 185 and 186, see Figs. 27, 28 and 29, are adapted to carry a sleeve member 188, in said box section 182', the sleeve member 188 being held against axial movement by means of an adjustable clamping nut 189, which as shown, is made up of two parts, the outer part being indicated by the numeral 189', each part having threaded engagement with the left end portion of the sleeve 188, the two parts referred to being clamped together on the threaded portion of the sleeve by means of screws 189", a space 189''' being provided between the two parts of the nut.

The middle portion 190, of the sleeve 188, is tapered as shown, in Fig. 29, adapting said sleeve to receive the cam 191 which is provided with a bore complemental to the aforesaid taper portion 190 of the sleeve.

A key 192 is provided between the complemental taper surfaces to prevent angular movement between cam member 191 and sleeve member 188. The cam member is provided with suitable hubs 193 which project from each side of the body portion of the member 191. The cam is secured in position on the taper portion of the sleeve 188 by means of nuts 194 and 194', said nuts having threaded engagement with the sleeve member 188. The nut 194 is adapted to press home said cam member forcing the hub portion 193 of the cam onto the aforesaid tapered portion 190 of the sleeve member 188. The nut 194' is adapted to be used to force the cam member 191 from fixed contact with the middle portion 190 of the sleeve 188, it being understood, of course, that the nut 194 is first removed from contact with the hub 193 of the cam member 191.

The right hand end of the sleeve 188 as viewed from in front of Fig. 29 is adapted to have fixedly secured thereto a graduated member 195, the graduated member 195 being caused to rotate with said sleeve 188 by means of a key 196 as shown in Fig. 32. The member 195 is graduated as shown, preferably 30° each side of zero line 197, said zero line being deposed 90° of arc from the center line of the key 192 of the cam 191 for convenience in assembling, the cam 191 being so positioned with respect to the graduations that it will properly co-operate with its abutment in the various positions of adjustment. The member 195 is also provided with a crank handle 198 for a purpose also to be later described.

The inner member 164 of the index head is journaled on an extension 195' of the member 195, as shown in Fig. 32 and is adjustably secured to said member by means of a T-slot 199 and bolts 200, the magnitude of adjustment of the index head being determined by means of a zero line 201 graduated on the periphery 202 of a portion of the index head 164 as shown in Fig. 29. The necessity for this adjustment was referred to above.

The inner sleeve 203 is journaled in the outer sleeve 188, said sleeve having a threaded shoulder 204 which abuts, see Fig. 29, the end portion 205 of the outer sleeve 188. A dust cover 206 has threaded engagement with the threaded portion 204 and covers the end por-

Indexing mechanism

The other end of the sleeve member 203, see Fig. 32, has fixedly secured thereto a gear wheel 207, the hub 207' of which is forced against the shoulder of the inner sleeve 203 by means of the hub 208 of an anchor wheel adaptor 209 journaled on the outer reduced end portions of the inner sleeve 203 and a nut 210, which has threaded engagement with the end portion of the inner sleeve 203. The hub portion 208 of the anchor wheel adaptor is journaled as shown in a hub 211 of an outer index head housing member 212.

The outer housing member 212 of the index head is located centrally with respect to the inner index head housing member 164 by virtue of a centralizing annulus nose 213, which is machined concentric with the axis of the sleeve members aforesaid, the inner cylindrical portion 164' of the covering member 164 being machined in like manner, adapting it to receive the nose portion of the outer member referred to, said housing members 164 and 212 being secured together as a unitary part by means of cap screws 214.

An anchor wheel 215 is provided with the hub and shoulder as shown, adapting it to be secured to the anchor wheel adaptor member 209 by means of fillister head screws 216, the outer portion 217 of the hub of the anchor wheel 215 being provided with a thread adapting it to receive a dust cover 218, by means of a threaded engagement of the cover with the portion referred to. The anchor wheel 215 is further provided with teeth 219 disposed about the periphery thereof, the number of said teeth 219 being in multiples of the teeth in the cutter or gear being ground for a purpose to be later described.

The web 207' of the gear 207 is adapted to receive fillister head thrust screws 220 which are adapted to impinge against thrust washers 221 upon the inner side of the gear 207, forcing them against the end portion 222 of the outer sleeve 188 to prevent lost motion between the inner sleeve 203 and the outer sleeve 188, said fillister head screws 220 being secured in adjusted position by means of a locknut 223 engaging the outer side of the gear.

The teeth of the gear 207 engage the teeth of a pinion 224, said pinion being secured to a shaft 225 which is journaled in an eccentric bearing 226, the outer portion of said bearing being secured to a hub projection 227 of the outer index member 212, by means of a flange clamping member 228 and fillister head screws 229 passing through the flange clamping member 228 and having threaded engagement with a flange 230, of the hub projection 227, of the outer member 212.

As shown in the drawing, Fig. 32, it is to be understood that the flange clamping member 228 abuts an annular projection 226' of the bearing 226 and that there is a space provided between the flange clamping member 228 and the flange portion 230 of the hub projection 227 to effect the clamping of the bearing 226 to the projection aforesaid. The eccentric bearing member 226 may be provided with suitable holes, the positions of which are indicated by dotted lines in Fig. 35, adapting it to receive a commercial spanner wrench as is well understood in the art, so that if the screws 229 are loosened, the bearing 226 may be slightly rotated to adjust the pinion 224 toward or away from the axis of the gear 207 to effect proper mesh between the teeth of the pinion 224 and the teeth of the gear 207.

The shaft 225 has a reduced outer end portion extending beyond the outer end of the bearing 226 and is provided with a washer 231 which is forced on the reduced diameter of the extension of the shaft 225, and against the shoulder formed by said reduced diameter on said shaft, in such manner as to give a slight longitudinal play in the bearing, permitting the shaft 225 to be rotated freely in its bearing 226.

The outer end of the shaft 225 is further reduced in diameter to receive a change gear 232, which is secured to said shaft by means of a washer-nut 233. This change gear 232 is adapted to rotate on said shaft 225 without rotating same when the washer-nut 233 is free, and adapted to rotate the shaft 225 when the washer-nut is tightened, for a purpose to be later described.

The change gear 232, see Fig. 31, is adapted to be rotated by a change gear 234 having an intermeshing engagement therewith. A change gear 235 is detachably secured to the change gear 234 so that as the gear 235 is rotated, so also is the gear 234 rotated, said gears 234 and 235 being known in the shop as compound gears and adapted to rotate as a unitary part on a stub shaft 236, see Fig. 34, and prevented from moving axially by means of a washer-nut 237, having threaded engagement with said stub shaft as is well understood in the art.

The stub shaft 236 is carried by a sector arm 238, the hub 239 of which sector is journaled on an annular projection 240, of the outer housing member 212 of the index head and secured against angular movement by means of a bolt 241, which passes through an elongated slot in the sector arm 238, clamping said sector arm to the hub portion 241' of the outer housing member 212; the said bolt 241 having threaded connection with said extension 241'.

The position of the stub shaft 236 may be adjusted to any position within range of the slot in said sector arm 238, through which the stub shaft 236 passes and is secured to said sector arm by means of a nut 242, said nut having threaded engagement with the reduced portion of the shaft 236 which passes through said sector arm 238.

The teeth of the gear 235 engage the teeth of a change gear 243, the change gear 243 being keyed to a shaft 244 and secured against axial movement by means of a screw 245, and the shaft 244 being journaled in a bearing 246, pressed into the annular projection 240.

The inner reduced end 247 of the shaft 244, on the reduced portion thereof, has secured thereto the hub 248 of an escapement wheel 249 by means of a taper pin 250. The escapement wheel 249, see Fig. 35, is provided with four equiangularly disposed slots 251, the centers of which are radial and four arcuate slots 252, disposed between the slots 251 as shown in Fig. 35, the four arcuate slots extending through equal arcs of equal circles whose centers are beyound the periphery of the escapement wheel 249 and spaced equiangularly with respect to the center of the escapement wheel.

A roller 253, see Figs. 34 and 35, is journaled on a stub shaft 254, the reduced portion of which stub shaft is pressed into a worm wheel 255, fixedly securing said stub shaft to said worm wheel as shown. The roller 253 engages the radial slots 251 of the escapement wheel 249 as shown.

The worm wheel 255 is further provided with the circularly curved axially projecting rib 256, the center of which is at the axis 255' of the worm wheel indicated in Fig. 35, the axis 255' being also at the center of curvature of each of the arcuate slots 252 when it occupies a predetermined circumferential position between the axis of the worm and escapement wheels; the angular length of said curved axially projecting member being slightly greater than one-half of a circle.

The teeth of the worm wheel 255 engage the teeth of a worm 257 and the wheel is rotated by said worm. The worm has end portions 258 reduced in diameter and adapted to be journaled in bearings 259 and 260, said bearings being fixedly secured to a portion 261, of the outer index housing member 212. The end of the worm shaft 258 which is journaled in the bearing 260 passes through said bearing 260, and is coupled to a flexible shaft 262, by means of a coupling 263 and taper pins 264. The flexible shaft 262 is carried in a flexible tubular casing 265 which is secured from displacement by means of the threaded relation between said casing and a threaded portion of the bearing 260 as is well understood in the art.

The flexible shaft 262 is driven by means of a bevel gear 266 fixed to a shaft 267, see Fig. 16, said flexible shaft having the usual commercial detachable connection with the shaft 267 which shaft is journaled by means of the ball bearings 268 in the housing 269, see Figs. 1, 2 and 3, said housing being secured to an annular projection of a flanged housing 270 secured by bolts 271 to the bed 2.

The bevel gear 266 is driven by a bevel gear 272, see Fig. 16, which gear is fixedly secured to a shaft 273, said shaft being driven by means of intermeshing bevel gears 274 and 275, the shaft 273 being journaled in ball bearings 276 and 276' which are carried by a projecting portion of the flanged housing 270, see Fig. 4, the bevel gear 275 being fixedly secured to the main driving shaft 92 by means of the taper pin 277, hence rotary motion is transmitted to the worm wheel 255 from the main drive shaft 92 by means of the cooperating members just described.

The worm wheel 255 is fixedly secured to a shaft 278, see Figs. 32 and 34, preferably by means of a pin 279. The worm wheel shaft 278 is journaled in suitable bearings secured to the outer housing member 212 of the index head, and secured at the inner end of said shaft 278, by means preferably of a pin 280, is a cam 281 adapted to engage a roller 282 journaled on the outer end of a stub shaft 283. The inner end of said stub shaft 283 is securely fixed to the outer end 284' of a rocker-arm 284. The inner end 284'' of said rocker-arm is journaled on one end of a stub shaft 285, and secured against axial movement by means of a washer 286 and a nut 287, said nut having threaded engagement with the reduced outer end portion of the shaft 285. The inner end 285' of stub shaft 285 is fixedly secured to a hub projection 288 of the outer index housing member 212. Intermediate the ends of the rocker-arm 284 is an integral projection 284''' which is provided with a slot 284'''', adapting said integral part to receive a pawl 289, which is secured to said integral projection by means of the fillister head screws 290, said pawl 289 being provided with an integral projecting element 291 the outer edge of which is rounded and adapted to engage in the space between the teeth 219 of the anchor wheel 215, for a purpose which will be later described.

The roller 282 of the pawl carrying rocker-arm 284, is caused to follow the outline of the lobe of the cam 281 by means preferably of a tension spring 292, one end of which spring is adapted to be secured to a portion of the rocker-arm 284, as illustrated in Fig. 31, whilst the other end of the spring is adapted to be secured to a stud 293, which is firmly fixed to the outer index housing member 212.

As the worm wheel 255 is rotated from the source of power as previously described, the roller 253 will in its cycle of movement enter a radial groove 251 of the escapement wheel 249 and cause it to rotate one-quarter of a revolution. As the roller 253 leaves the groove 251 of the escapement wheel, the projecting arcuate rib 256 of the worm wheel 255 will enter one of the arcuate slots 252 of the same curvature in the escapement wheel, which locks the escapement wheel 249 against accidental movement. The continued rotation of the worm wheel 255 will cause the curved projection 256 to rotate out of the curved groove 252 of the escapement wheel, simultaneously therewith the roller 253 will enter the next radial groove 251 and again cause the escapement wheel 249 to rotate one-quarter of a revolution. Four revolutions of the worm wheel 255, therefore, are required to cause the escapement wheel 249 to make one revolution.

By means of the change gears heretofore referred to; namely, change gears 243, 235, 234 and 232, the pinion gear 224 may by providing change gears having the proper ratio, rotate the inner sleeve 203, by means of the intermeshing gear wheel 207, any fractional part of a revolution that may be found necessary in practicing the invention. The following example may be cited as representative:

For a specific setting it will be necessary to know the ratios between all controlling factors and then select the change gears necessary for a given number of divisions. In the embodiment of the invention in machines heretofore constructed, the worm gear 103 has been provided with eighty-nine teeth and is driven by a worm 102 having four teeth. The same ratio has been held with respect to the worm wheel 255 which is provided with eighty-nine teeth and the engaging worm 257 provided with four teeth.

The bevel gears 275, 274, 272 and 266, being mitre gears will cause the worm 257 to make one revolution for each revolution of the main drive shaft 92. It follows, therefore, that the ratio of the index head is in the order of four to eighty-nine, with a correspondingly equal ratio between the drive shaft 92 and the worm wheel 103. It will later be obvious that since these ratios are equal, they may be neglected in determining change gears for a specific number of divisions of the work spindle sleeve 203. We have only to consider the ratio between the worm wheel 255 and the escapement wheel 249 which is in the order of four to one, that is to say four turns of the worm wheel 255 to cause the escapement wheel 249 to make one turn, and the ratio between the pinion 224 and the sleeve gear 207.

The pinion gear 224 has been preferably provided with thirty-two teeth, whilst the gear 207 has been provided with one hundred and ninety-two teeth, making a ratio between these gears of six to one, taking one-quarter of the ratio found with reference to the escapement and worm wheels, of the one to six ratio between the pinion and gear, gives what may be termed a natural inherent ratio of one to twenty-four. That is to say, if the change gears heretofore referred to were all provided with the same number of teeth, the sleeve 203 would be set up for twenty-four divisions to the circle and each division would correspond to one revolution of the worm wheel 255 which will be hereinafter referred to as the cycle of operation. For every cycle of operation, therefore, it is obvious that the cam 281 on the worm wheel shaft will make a complete revolution, and also obvious that the configuration of the lobe of the cam must be of such form as to perform its function of raising and lowering pawl 291 during the time the roller 253 is in contact with the groove 251 of the escapement wheel 249. The lobe of the cam 281 as illustrated is of substantially the correct form to the given scale. A more detailed description will follow at the completion of certain mechanisms remaining to be described.

*Mounting of work*

The inner sleeve 203 has journaled therein the work spindle member 294, see Figs. 29 and 32, the working end 294' of the spindle being tapered as shown and journaled in a bronze bushing 295 which has a press-fit in the inner sleeve 203.

The work spindle is provided with a shoulder 294'' and a thrust washer 296, to take the thrust between the sleeve 203 and spindle 294. The spindle 294 is further provided with a reduced portion 294''' which is adapted to receive fixedly secured thereto the hardened and ground flanged bushing 297. The spindle 294 is further provided with a reduced threaded end portion 294'''' which is adapted to receive a nut 298 and a washer 299.

The work W is secured to the spindle 294 as illustrated in Fig. 29; a suitable washer 300 being interposed between the work W and the flange of the bushing 297. The axial length of the washer 300 is such as to locate the face W' of the work W so that a straight line L perpendicular to and intersecting the middle point of said face, coincides with the axis O of the cutting element spindle as indicated in Fig. 3.

The adjusting end of the spindle 294 opposite that to which the work is attached is shown in Fig. 32, the work spindle being journaled in the sleeve 203 at the adjusting end of same through the medium of the bearing 301, which has a press-fit in the sleeve 203. A thrust washer 302 is held against the end of the sleeve 203 by means of a nut 303 having threaded engagement with a threaded portion of the spindle. This nut 303, after being suitably adjusted, is fixedly secured to the spindle by means of a worm wheel 304 fixed to a reduced end portion of the spindle outwardly of the threaded portion upon which the nut is mounted, the same being pressed against said nut to fixedly secure the same by means of a nut 305 having threaded engagement with the reduced end portion of the spindle 294. The worm wheel 304 is thereby fixedly secured to spindle 294, inasmuch as said worm wheel is serving as an interposed member between the adjusting nut 303 and the final locking nut 305.

The cycle of operation of the work previously referred to, said cycle being positive and inflexible, does not provide any adjustment of the work relative to the cutting element. It is obvious that such adjustment must be independently controlled and arranged in such manner as not to interfere with the said cycle of operation. The following mechanism is preferably provided to advance the work against the cutting element independently of the cycle of operation or any other correlated movements of the machine.

The worm wheel 304 engages a worm 306, said worm being fixedly secured to a shaft 307, see Fig. 32. The shaft 307 is journaled in a bracket 308, which bracket is secured to the anchor wheel 215 by means of screws 309, see Fig. 33.

A spiral pinion 310 is fixedly secured to one end of the worm shaft 307, preferably by means of a taper pin 311. A crown spiral gear 312 engages the teeth of the spiral pinion 310, the spiral gear 312 being journaled on the hub 303' of the worm wheel 303 previously referred to, see Fig. 32, and prevented from longitudinal displacement by means of a nut 313 which has threaded engagement with an external threaded portion 305' of the nut 305.

The crown spiral gear 312 is provided with a single continuous spiral tooth, or with a single thread, as it is referred to in the shop, so that one revolution of said spiral gear 312 results in an arcuate movement of one tooth of the spiral pinion 310, and a very slight movement of the worm 306 and of the intermeshing worm wheel 304.

To enable the operator to know approximately, within close limits, the actual movement of the work independently of the cycle of operation, against the cutting element, there has been preferably provided a certain mechanism to enable the operator to note a fractional part of a turn given by him to the spiral crown gear 312. Holes 314 provided in the hub portion of the crown spiral gear 312 and a spring actuated plunger 315 carried by the worm 304 provided with a rounded end adapted to enter the holes and engaging the inner face of the crown gear provide a very satisfactory arrangement for this purpose. As the operator rotates the crown gear 312 by grasping the knurled extension 312' thereof, the plunger 315 bearing against the inner face of the gear offers a certain amount of resistance to the rotation of said crown gear, and as the crown gear is rotated, the plunger 315 is forced into the worm wheel when engaging the flat portions of the face of the gear 312 and the spring forces it out of the worm wheel when the plunger registers with one of the aforesaid holes 314. The operator tells, therefore, by the feel of the resistance offered by the plunger as the crown gear is rotated by him, very accurately, the amount of movement given to the crown gear 312.

In a battery of machines now in operation the crown gear 312 was provided with twenty of the holes 314, and by means of the ratios of the mechanism previously described, the movement of the crown gear from one hole to another easily determined by means of said plunger 315 results in an arcuate movement of substantially .0001 inch measured on a three inch pitch circle in the work W and a proportionate amount on pitch circles of other diameters.

*Actuation of work spindle slide*

Referring to Figs. 27, 28 and 29, the cam 191 is provided with a spiral curve 191' of the type having a uniform lead in accordance with the descriptive terms previously defined in this specification. In this specific illustration the curve 191' is an involute of a circle characterized in accordance with the Simmons' Law of the Involute. The line T see Fig. 27, is the tangent line to the evolute from which the involute 191' is generated.

A roller 316 against which the involute surface of the cam bears, is journaled on a shaft 317, the axis of which shaft, as shown in Fig. 27, coincides with the tangent line T, the shaft 317 being secured to a yoke 318, which yoke is fixedly secured to a sliding spindle 319, by means of a set-screw 320, see Fig. 28. The spindle 319 is adapted to be moved in and out of a tail-stock 321 by means of the usual tail-stock screw 322 and hand wheel 323, and, when moved to a given position, it may be secured in that position by means of the usual clamping screw 324. The base 321' of the tail-stock is fixedly secured to the right hand end portion of the swivel 170 by means of cap screws 325. If, therefore, the connecting rod 156, is being actuated, the slide 182 will be caused to move in the direction of the arrow 326 in Fig. 27 by virtue of the contact of the curved face 191' of the cam 191, with the roller 316 of the tail-stock 321; the cam 191 being caused to rotate in the direction indicated by the arrow 327 in Fig. 27. This, therefore, is a positive movement of the slide in one direction, and the slide is returned at the reversal of the stroke of the connecting rod to its original position by means of a weight 328 fastened to the lower end of a cable 329, see Figs. 1, 2, 3 and 27.

The cable 329, as shown, goes over guide sheaves 330 and 331 and through an eye-bolt 332, which eye-bolt is fastened to an end plate 333 which is secured to the slide 182 by any suitable means; as for example cap screws, 334, see Fig. 3.

The lower portion 318' of the roller supporting yoke 318 abuts the extension 319' of the tail-stock spindle 319, see Fig. 27. This is for the purpose of assembling the yoke 318 with the tail-stock spindle 319 so that the axis of the roller shaft 317 will be parallel in the given plane to the axis of the work spindle 294, which axis is the axis of rotation of the cam 191, and to effect line contact of the roller 316 with the curved face 191' of the cam. This feature enables the operator to change yokes 318 as is necessary in practice. For example, when cams are changed and it becomes necessary to have the axis of the roller shaft 317 coincide with another tangent line T, it can be shown that, if the curve 191' is generated, for example as an involute from a base circle of, let us say, three inch diameter or on any other spiral curve having a lead along a straight line corresponding to the lead of the involute of a three inch base circle, any one of an infinite number of involute curves may be generated on the face of the teeth of corresponding three inch pitch diameter work blank, by the simple expedient of setting the swivel base 170 to the proper pressure angle as determined for the specific case through the medium of the degree graduations 169 and the vernier 172, previously referred to and illustrated in Fig. 3. This for the reason that if the involute curve 191' has been generated from an evolute of three inch diameter, there will be a resultant movement of the slide 182 corresponding to the measure of the perimeter of the evolute which is in this instance three inches in diameter. It is to be observed that this movement of the slide corresponds to and is identical with the movement of a rack engaging a pinion of three inch pitch diameter. It is now obvious that the pitch and pressure angles can be infinite in number. It is further obvious that when the swivel base is set to the pressure angle of the gear teeth as described, the machine will function on the moulding generating principle of action. The swivel member 170, as illustrated in Fig. 1, is shown swivelled to the angle of pressure and to operate on the moulding generating principle of action.

It is necessary in this invention when the machine is adapted to operate on the moulding generating principle of action, that a cam 191 be provided for each pitch diameter. For example, if, as heretofore referred to, the work is of three inch pitch diameter, which is one size of a well known gear shaper cutter, one cam° only will be necessary for any pitch or pressure angle, for three inch gear shaper cutter or gear, as the case may be, and the one cam 191 with the curve 191', as described, arranged for three inch pitch diameter cutters, will be suitable for three inch pitch diameter cutter of any pitch or pressure angle. This holds true with respect to four inch gear shaper cutters in which case the curve 191' of the cam would be generated from an evolute of four inch diameter, and this cam, like the cam previously mentioned, will serve for any four inch gear shaper cutter or gear, as the case may be, for any pressure angle and pitch within the capacity of the machine, as will be understood by mechanics generally. It is obvious, therefore, for any change from what may be termed a three inch cam to a four inch cam, that the yoke 318 must be selected for the specific cam in question and mounted on the tail-stock spindle 319 as previously described. In each instance it will be obvious, for example, the three inch cutter, that the tangent line T, see Fig. 27, must be one and one-half inches removed from the axis A of the work spindle 294, and likewise in the case of the four inch cam, that the tangent line T will have to be two inches from the axis A of the work spindle 294.

To adapt the machine to operate on the describing generating principle of action it is necessary that the curve 191' of the cam be such that it will cause a movement of the work holder slide the same as would be produced by a curve identical with the curve that is desired to be produced on the teeth of the work W. For example, let it be assumed that it is desired to generate involute curved surfaces forming the faces of the teeth of a gear shaper cutter or gear of say, three inch pitch diameter, twenty degrees pressure angle. The curve 191', therefore, is preferably the involute curve identical with the curve to be generated from a base circle determined by a pressure angle of twenty degrees to a three inch pitch circle but may be any spiral curve having the same lead along a line parallel with the slideway. The diameter of the evolute from which the curve 191' would be generated if an involute or from which the lead is determined if another spiral curve is used is determined by multiplying the pitch diameter by the cosine of the pressure angle. In this specific case the pitch diameter is three inches, the pressure angle is twenty degrees and the cosine of twenty degrees (Wells) is .93969, so that the diameter of the evolute is 2.81907 inches and results further in an involute lead in accordance with the Simmons' Law of the Involute of 8.85639 inches.

If the cam 191 is provided with an involute curve 191' having the characteristics just described, and the swivel 170 be set at zero, as shown in Figs. 2 and 3, and the axis of the shaft 317, indicated by the tangent line T, Fig. 27, be also a tangent to the evolute, having a diameter above mentioned, the machine will be adapted to operate on the describing generating principle of action, because the cutting element 5 is perpendicular to the rectillinear movement of the slide 182, and perpendicular to the axis 321″ of the tailstock 321, and a single tangential point of contact will result between the cutting element and the curved faces of the teeth of the work, there being contact at no other place on said face of the cutting element. This will be found to be in accordance with the describing generating principle of action as defined by Flanders in his book "Gear Cutting" published by John Wiley and Sons, New York, 1909.

The swivel 170 is shown swivelled to twenty degrees in Fig. 26 and it is to be noted that the graduated scale 335 coincides with the zero plate 336 at the twenty degree mark, and further to be observed that the axis A of the work spindle, with the slide 182 in the position shown and described, is directly above the axis of the swivel bearing 170.

It is to be understood that the zero line plate 336 is securely mounted by means of suitable button-head screws 336′ to the flat portion 171′ of the flange 171 of the swivel 170, so that as the member 170 is swivelled about its axis, the zero plate 336 is swivelled also and in accordance therewith.

The zero plate 336 is so placed that if the swivel 170 be set at zero, as in Fig. 2, the zero of the graduated plate 335 would coincide at the zero reading with the zero plate 336, so that as the swivel 170 is set at the different angles, so also is the slide 182 set at that angle by means of the tail-stock spindle 319 and the tail-stock 321 previously described. The graduated degree plate 335 is fixedly secured to the slide 182 by means of the button-head screws 337.

*Operation*

Assuming that a gear or gear shaped cutter blank has been securely clamped between the washers 299 and 300 on the spindle 294, that a cam of proper curvature has been fixed to the sleeve 188 and that all the necessary adjustments of the cutting element and work spindle carriage supports, work spindle carriage, cam, tailstock, work spindle and indexing mechanism have been made, the operation of the machine is as follows: The cutting element 5 is continuously rotated at a uniform speed by means of the driving belt 73 and is rigidly held with its cutting face in a plane at right angles to its shaft 39 and at the proper angle and position with respect to the plane and axis of the gear or cutter upon which it operates. During the cutting or grinding operation the work spindle is turned about its axis and the work spindle carriage is also reciprocated bodily in a direction transverse to said axis and toward and from the face of the cutting element, the above mentioned rotary and linear movements being so correlated during the engagement of the work with the cutting element that the desired involute curve is generated upon the faces of the teeth of the gear or gear shaped blank, being cut or ground and, during a portion of the stroke of the work spindle carriage while the work is out of contact with the cutting element, the cutter spindle is turned by the indexing mechanism through the angle necessary to bring successive teeth of the gear or gear shaped blank into position for engagement with the cutting element.

The indexing head is mounted upon the outer end of the sleeve 203 within which the work spindle 294 is journaled and upon which is mounted the sleeve 188 to which the cam 191 is attached, and the head, sleeves, cam and work spindle are connected together for simultaneous movement during the engagement of the work with the cutting element. The cam 191, coacting with the fixed tail stock 321, has a curvature such that it imparts to the work spindle slide 182 a linear movement which is so correlated with respect to the simultaneous rotary movement of the work spindle as to cause the desired curvature to be generated by the cutting element on the teeth of the blank. During the time the blank is out of contact with the cutting element the work spindle 294 is released from the sleeve 203 and the indexing mechanism is actuated to turn the work spindle 294 with respect to the sleeve 203 through an angle equal to the angular space between the successive teeth of the blank. In the normal operation of the machine, all of the work spindle actuating devices are operated from the drive shaft 92 which is driven by the silent chain 100 from a suitable motor in the base of the machine.

The oscillating movement of the cam sleeve 188 is imparted thereto through the worm 102, the worm wheel 103, the crank disk 111, the rack shaft 117, the segment 130, the shaft 131, the crank arm 146, the adjustable connecting rod 156, (see Fig. 16), and the inner index housing member 164 which is adjustably attached to the cam sleeve 188.

Through the connections above mentioned the cam sleeve 188 is oscillated through a predetermined arc and the cam 191 while moving in one direction acts against the fixed tailstock and causes the work spindle slide 182 to move away from the tailstock and while moving in the opposite direction, permits the slide 182 to move toward the tailstock. The work spindle 294 is locked to the cam sleeve during the portion of the movement of the slide 182 in which the blank is in engagement with the cutting element, this engagement occurring during the movement of the slide 182 away from the tailstock. During the action of the cutting element on the blank the cam and blank are turning together, the large end of the cam turning toward the tailstock and the tooth of the blank engaging the face of the cutting element turning toward said face.

The curvature of the cam is such that the combined rotary and linear movement of the blank with respect to the face of the cutting element causes the cutting element to generate on the face of a tooth of the blank in engagement therewith the proper involute curve for said teeth.

When the machine is adjusted to operate upon the moulding generating principle, the swivelled work carriage support 170 is adjusted by means of the worm 174 and, by means of the graduated scale 169 and vernier 172, is accurately set at an angle to the horizontal corresponding to the pressure angle of the teeth of the gear or gear shaped cutter to be generated, and the curve on the face of the cam 191, if an involute curve, will have an evolute circle equal in diameter to the diameter of the pitch circle of the gear or gear shaped cutter to be ground. The abutment roller 316 is mounted to rotate on a fixed axis which lies in the plane of a tangent to the evolute circle of the cam which is parallel to the plane of movement of the axis of the work spindle. i. e., at an angle to the horizontal equal to the pressure angle, the roller 316 being supported by its yoke 317 at the proper height above the bottom of the slide 182.

The point of engagement between the cam face 191 and the roller 316 will always be in a plane tangent to the evolute circle above referred to since the common tangent of the roller and cam is always normal to this plane.

While the cam 191 is being turned toward the roller 316 a linear movement will be imparted to the work spindle which is equal to the angular movement of the spindle measured on the pitch circle of the gear.

Regardless of the angular adjustment of the work spindle slide the curve generated upon the faces of the gear teeth will be the involute of a circle and the base circle of any involute so generated will be a base circle of a diameter so proportioned to the diameter of the pitch circle that the pressure angle of the teeth will be the angle to which the work spindle slide is set, i. e., a diameter equal to the diameter of the pitch circle multiplied by the cosine of the pressure angle. Therefore, the proper involute curvature for teeth having any desired pressure angle can be generated upon the teeth of a gear or gear shaped cutter blank of a given pitch diameter by the moulding generating principle of action without changing the cam 191.

When the machine is adjusted to operate on the describing generating principle of action the work carriage support is adjusted to horizontal position in which position the plane of movement of the work spindle carriage is horizontal and at right angles to the vertical plane of the front face of the cutting element 5. In this instance, the face of the cam, if formed on an involute curve, must be identical with the involute curves to be generated on the blank and the axis of the roller 316 will be in a horizontal plane tangent to the base circle or evolute of the curves to be generated on the teeth of the blank. Since the axis of the roller 316 is in a horizontal plane tangent to the evolute of the cam face, the roller and cam will always engage in said tangent plane which is normal to the common tangent of the roller and cam at all points of contact.

When the machine is operating on the moulding generating principle of action the face of the cutting element has a sliding contact with the teeth of the blank, since as the blank moves away from the cutting element the point of contact of the tooth with the cutting element lies in different tangents to the evolute, whereas, when operating on the describing generating principle the point on the cutting element engaging the blank is always in the same horizontal plane tangent to the evolute.

The work spindle slide is moved in a direction to carry the blank away from the cutting element by the pressure of the cam against the roller 316 while the cam is turning in one direction and is moved in the opposite direction during the reverse movement of the cam by the counterweight 328 which exerts a constant force on the slide in the direction of the tailstock 321 upon which the roller 316 is mounted. Since the pressure is always exerted in the direction of movement of the slide and normal to the common tangent of the involute cam and cylindrical roller the pressure of the cam on the roller is practically the same throughout the cycle of operation.

In both the moulding generating and describing generating principles of action where an involute cam is employed, the roller 316 might be replaced by an abutment block 316ª having a flat cam engaging face lying in a plane at right angles to the path of movement of the work spindle slide 182 as shown in Fig. 38. The flat surface of the block 316ª will always be tangent at a fixed point to a given involute cam having its center at the axis of the work spindle, and it is unnecessary to provide for vertical adjustment with respect to the work spindle carriage for different cams as in the case of the roller abutment.

Any cam of involute curvature for either the moulding generating principle of action or the describing generating principle of action may be replaced by an Archimedean spiral engaging an abutment fixed to the tailstock in the plane of the axis of the work spindle or by a spiral curve not an involute of a circle but having a constant lead along a line parallel with the path of movement of the slide and engaging, on the line of constant lead, an abutment carried by the tailstock. For the moulding generating principle of action the lead of such spiral curve must be equal to the lead of the involute of the pitch circle and for the describing generating principle of action the lead of the curve must be equal to the lead of the involute of the base circle. Where the face of the cam is on a curve other than an involute the tailstock abutment should have a point contact with the cam such as the abutment 316$^b$, shown in Fig. 39.

For indexing the blank during the intervals in which the teeth of the blank are out of contact with the cutting element, the shaft 92 has a direct driving connection with the work spindle 294 through the indexing mechanism mounted upon the end of the spindle opposite that to which the blank is attached. This driving connection is through the shaft 273 connected by bevel gears with drive shaft 92 and the flexible shaft 262 which drives the worm 257 which meshes with the worm wheel 255 which, in turn, intermittently drives the escapement wheel 249 by means of the roller 253 which engages in radial slots 251 of the wheel 249. The escapement wheel 249 is held against rotation during the intervals between the actuations thereof by the roller 253 on the wheel 255 by the arcuate rib 256 on the wheel 255 engaging in an arcuate groove 252 in the escapement wheel. The work spindle 294 is driven from the escapement wheel 249 through change gears 243, 235, 234 and 232, the pinion 224 fixed to the same shaft 225 to which the gear 232 is fixed, and the large gear 207 fixed to the inner sleeve 203 upon which the cam sleeve is mounted and within which the spindle 294 is mounted and to which the spindle 294 is normally locked by means of worm wheel 304 fixed to the spindle and worm 306 mounted in a casing carried by the anchor wheel 215 which is fixed to the sleeve 203. The anchor wheel 215 and the gear 207 are both fixed to the sleeve 203 and the number of teeth 219 on the wheel 215 are as previously stated in multiples of the number of teeth in the blank. The pawl 291 which is mounted on the bracket 284 carried by the index head housing member 164, for movement into and out of engagement with the teeth 219 of the anchor wheel, is so actuated by the cam 281 fixed to the shaft 278 of the worm wheel 255 that the pawl 291 is disengaged from the anchor wheel while the roller 253, carried by the wheel 255, is in engagement with the radial slots 251 of the escapement wheel and is engaged with the teeth of the anchor wheel while the roller 253 is out of engagement with the slots, the pawl serving to lock the work spindle to the cam while the cutting element engages the blank. The roller 253 engages one radial slot of the escapement wheel during a small portion of each revolution of the worm wheel 255 and turns the wheel 249 through a quarter turn, the cam 281 being so shaped as to free the pawl 291 from the anchor wheel during the movement of the escapement wheel 249 and the rotation of the sleeve 203 and spindle 294. The operation of the escapement wheel is timed to occur during the interval in each cycle of operation in which the blank is free from the cutting element and the gear ratio in the indexing head is such that the turning movement imparted to the blank is just equal to the angular space between successive teeth thereon, the change gears 232, 234, 235 and 243 being so selected as to provide the proper gear ratio between the escapement wheel 249 and the work spindle. The pawl 291 which is carried by the housing member 164 which is in turn fixed to the cam sleeve 188 serves to positively lock the sleeve 203 and spindle 294 to the cam sleeve for rotation therewith during the intervals between indexing operations and since the number of teeth on the anchor wheel are a multiple of the teeth on the blank the pawl always engages a space between teeth 219 which is properly positioned to lock the work spindle to the cam with each successive tooth of the blank in exactly the same position relative to the cam and to the cutting element.

It will be apparent that, although the rotary movement imparted to the cam through the cranks and connecting rods is not a uniform rotary movement and consequently the movement of the work spindle slide 182 is not uniform, the linear movement of the slide is so correlated to the rotary movement of the cam and work spindle during the engagement of the blank with the cutter that the same curve will be generated by the cutter regardless of the speed of movement. As will readily be seen by examination of the movement diagram in Fig. 24, the angular velocity of the cam gradually increases from the lowermost to the uppermost position of the connecting rod 156, and since the cam is at the beginning of its active stroke when the rod 156 is in its lowermost position and at the end of its stroke when the rod 156 is in its uppermost position, the velocity of the slide 182 increases as it moves away from the tailstock 321 and is greatest while the blank is out of engagement with the cutting element. This is a very advantageous feature, since, by providing relatively slow rotary and linear movement of the blank while in engagement with the cutting element and relatively rapid movement while out of engagement with the cutting element and while the indexing operation is being performed, the time required for a complete cycle of operations can be considerably reduced. The indexing operation can be performed in a very short space of time and the intervals between operations of the cutting element on successive teeth may be made very short. In other words the machine may operate at a speed such that the rate of movement of the blank with respect to the cutter during engagement therewith is as high as is consistent with efficient cutting operation and a relatively small proportion of the time of each cycle of operation will be consumed by the indexing operation.

Adjustments

The various adjustments heretofore described enable the operator to quickly and accurately set the machine for generating involute teeth of the desired depth, pitch and pressure angle. In setting up the machine for finishing a given gear or gear shaped cutter, a cam will be placed on the sleeve 188 which is preferably in the form of an involute of the pitch circle or the involute of the base circle depending on whether the machine is to operate on the moulding generating principle or on the describing generating principle, it being understood that other cams having the form of other constant lead spiral curves may be used providing the lead of such curve is equal to the lead of the involute of the pitch or base circle as the case may be. The change gears 232, 234, 235 and 243 and the anchor wheel 215 must be so selected with respect to the number of teeth that the gear ratio provided by the change gears will produce a rotary movement of the work spindle upon each actuation of the escapement wheel equal to the angular space between successive teeth of the blank and that the number of teeth of the anchor wheel will be in multiples of the number of teeth on the blank, the change gears being so mounted as to be readily removable and adjustable one with respect to another in order to accommodate gears of different sizes.

The cutter may be very accurately adjusted to the proper angle with respect to the work by means of the worm segment 6, the worm shaft 7, the scale 6' associated with the segment and the minute range drum 11 associated with the worm shaft. The lateral adjustment of the cutter may be accurately controlled by the screw 24 provided with the graduated hand wheel 25 and accurate vertical adjustment is provided by the screw operated by the hand wheel 32.

An important feature of the present invention is the provision of means for varying the stroke of the cam actuating mechanism so that the rotary and linear movement of the work is only that necessary to permit the teeth of the blank to clear the cutting element during the indexing operation.

For shallow teeth the cam actuating mechanism may be adjusted to a short stroke and for deeper teeth the mechanism may be adjusted for a proportionately longer stroke. This adjustment of stroke may be accomplished by adjusting the connection between the rack shaft 117 and the disk 111, the effect of the adjustment on the extent of angular movement of the cam being indicated by the graduations 120 on the disk. This adjustment is advantageous in that it permits the machine to be operated more rapidly when operating on blanks with shallow teeth. By shortening the length of the stroke the rate of linear movement of the work spindle slide is decreased and the speed of the driving motor may be increased proportionately to cause the cutting element to operate on a greater number of teeth in a given time.

It is very important that a tooth of the blank be properly positioned with respect to the cutting element before the machine is started into operation. When the cam is at a position such that the slide 182 is at the forward end of its stroke, the face of the cutting element should engage the lowermost point of the involute curve on the tooth. This may be accomplished with extreme accuracy by three adjustments, one a rotary adjustment of the work spindle, one a linear adjustment of the tailstock toward or away from the work spindle slide and one an angular adjustment of the cam about the axis of the work spindle. The work spindle may be turned in either direction within the sleeve 203 in which it is mounted by means of the crown spiral gear 312 at the outer end of the spindle and this adjustment may be very minute. The tailstock may be adjusted by means of the screw 322 to move the slide 182 in either direction to shift the work bodily toward or away from the cutting element, the extent of the adjustments being indicated by the graduated scale 335. The adjustment of the cam effects a movement of the slide similar to the adjustment of the tailstock, but the cam adjusting means is designed to provide a much finer adjustment than possible by means of the tailstock screw and graduated scale 335. This cam adjustment is effected by the micrometer barrel on the connecting rod 156 by means of which very minute changes may be made in the effective length of the connecting rod which will result in correspondingly minute angular adjustments of the index housing member 164 to which the upper end of the rod 156 is connected and of the cam sleeve 188 to which the member 164 is connected. The effect of adjustment of the rod 156 will be readily apparent from inspection of the movement diagram in Fig. 24.

The squared end 99 of the drive shaft 92 which is adapted to receive a hand crank enables the operator to operate the work actuating and indexing mechanism through a complete cycle by hand to enable him to make sure that all adjustments are properly made and that the machine is functioning properly.

After a gear or gear shaped cutter has been finished, the tooth curvature and the space between corresponding points on successive teeth may be accurately measured by means of a specially designed testing and measuring machine which will show minute inaccuracies which may have been caused by a slight inaccuracy in the setting of the work with respect to the cutting element and these inaccuracies may be reduced or eliminated by one or another of the minute adjustments made possible by the adjusting devices above referred to.

Having thus described my invention, I claim:

1. The herein described method of generating the faces of teeth of a gear shaped blank to an involute curve, which comprises engaging the blank with a cutting element, oscillating the blank about its axis and simultaneously causing the same to move in a direction radial to its axis away from and toward the cutting element into and out of engagement therewith at a linear speed equal to the angular speed as measured on the circumference of a given circle, and operating the blank at increased speed during the entire portion of its movement in which it is out of contact with the cutting element.

2. The herein described method of generating the faces of teeth of a gear shaped member to an involute curve, which comprises engaging the blank with a cutting element, oscillating the blank about its axis and simultaneously causing the same to move in a direction radial to its axis away from and toward the cutting element into and out of engagement therewith at a linear speed equal to the angular speed as measured on the circumference of a given circle, operating the blank at increased speed during the entire portion of its movement in which it is out of contact with the cutting element and turning the blank to bring another tooth to engaging position during the portion of the oscillation in which the blank is out of engagement with the cutting element.

3. The herein described method of generating the faces of teeth of a gear shaped member to an involute curve, which comprises engaging the blank with a cutting element, having its cutting portion in a given plane, oscillating the blank about its axis and simultaneously causing the same to move in a direction radial to its axis with said axis moving in a plane inclined with respect to the plane of the cutting element away from and toward the cutting element into and out of engagement therewith at a linear speed equal to the angular speed as measured on the circumference of a given circle by the engagement of a spiral cam fixed to the spindle and having its face formed on a curve which has a uniform lead along a straight line with an abutment fixed with respect to the cutting element support, and maintaining the point of contact between the cam and abutment in the line of uniform lead parallel with the direction of movement of the blank.

4. The herein described method of generating predetermined curves on the faces of teeth of a gear shaped member, which comprises engaging the blank with a cutting element, oscillating the blank about its axis and simultaneously causing the same to move in a direction radial to its axis away from and toward the cutting element into and out of engagement therewith at a linear speed equal to the angular speed as measured on the circumference of a given circle by the engagement of a cam fixed to the spindle and formed on a curve different from that to be generated with an abutment fixed with respect to the cutting element support.

5. The herein described method of generating the faces of teeth of a gear shaped member to an involute curve, which comprises engaging the blank with a cutting element, oscillating the blank about its axis at a non-uniform speed and simultaneously causing the same to move in a direction radial to its axis away from and toward the cutting element into and out of engagement therewith at a non-uniform linear speed equal at all times to the angular speed as measured on the circumference of a given circle by the engagement of a spiral cam fixed to the spindle with an abutment fixed with respect to the cutting element support, and operating the blank at increased speed during the entire portion of its movement in which it is out of contact with the cutting element and shifting the blank angularly with respect to the cam while out of engagement with the cutting element to cause the cutting element to act on another tooth thereof.

6. A machine for generating a predetermined curve on the faces of teeth of a gear shaped blank comprising a work spindle, a cutting element positioned to engage the teeth of the blank, supports for the cutting element and work spindle mounted for relative linear movement, an abutment fixed with respect to the cutter support, a cam mounted on the work spindle and engaging said abutment, manually operable means for adjusting the cam angularly on the work spindle, means for oscillating the work spindle about its axis, said cam having its abutment engaging face so formed as to cause the blank to be disengaged from the cutting element during a portion of the oscillation, and means for indexing the blank during the portion of each oscillation in which the blank is out of contact with the cutting element.

7. A machine for generating a predetermined curve on the faces of teeth of a gear shaped blank comprising a work spindle, a cutting element positioned to engage the teeth of the blank, supports for the cutting element and work spindle mounted for relative linear movement, an abutment fixed with respect to the cutter support, a cam adjustably fixed to the work spindle and engaging said abutment, means for oscillating the work spindle about its axis, automatically operable means for indexing the work spindle with respect to the cam, and manually operable means independent of the indexing means for turning the work spindle with respect to the cam.

8. A machine for generating a predetermined curve on the faces of teeth of a gear shaped blank, comprising a work spindle, a cutting element positioned to engage the teeth of the blank, supports for the cutting element and work spindle mounted for relative linear movement, an abutment fixed with respect to the cutter support, a cam adjustably fixed to the work spindle and engaging said abutment, means for oscillating the work spindle about its axis, and manually operable means connected with the cam for shifting the cam angularly on the work spindle and locking the same in adjusted position thereon.

9. A machine for generating a predetermined curve on the faces of teeth of a gear shaped blank, comprising a work spindle, a cutting element positioned to engage the teeth of the blank, supports for the cutting element and work spindle mounted for relative linear movement, an abutment fixed with respect to the cutter support, a cam adjustably fixed to the work spindle and engaging said abutment, means for oscillating the work spindle about its axis, manually operable means for shifting the cam angularly on the work spindle and locking the same in adjusted position, and independent means for shifting the spindle angularly within the cam and for locking same in adjusted position.

10. A machine for generating a predetermined curve on the faces of teeth of a gear shaped blank, comprising a work spindle, a cutting element positioned to engage the teeth of the blank, supports for the cutting element and work spindle mounted for relative linear movement, an abutment fixed with respect to the cutter support, a cam adjustably fixed to the work spindle and engaging said abutment, means for oscillating the work spindle about its axis, and means for varying the angle of oscillation.

11. A machine for generating a predetermined curve on the faces of teeth of a gear shaped blank, comprising a work spindle, a cutting element positioned to engage the teeth of the blank, supports for the cutting element and work spindle mounted for relative linear movement, an abutment adapted to be fixed in different positions of adjustment with respect to the cutter support, a cam secured to the work spindle for angular adjustment thereon toward and from said abutment and engaging said abutment, and means for oscillating the work spindle about its axis.

12. A machine for generating a predetermined curve on the faces of teeth of a gear shaped blank, comprising a work spindle, a cutting element positioned to engage the teeth of the blank, supports for the cutting element and work spindle mounted for relative linear movement, an abutment fixed with respect to the cutter support, a cam adjustably fixed to the work spindle and engaging said abutment, means for oscillating the work spindle about its axis, and means for adjusting each of said supports angularly and for securing the same in adjusted positions.

13. A machine for generating a predetermined curve on the faces of teeth of a gear shaped blank, comprising a work spindle, a cutting element positioned to engage the teeth of the blank, supports for the cutting element and work spindle mounted for relative linear movement, an abutment fixed with respect to the cutter support, a cam adjustably fixed to the work spindle and engaging said abutment, means for oscillating the work spindle about its axis, and means for adjusting one of said supports angularly about a vertical axis and the other of said supports angularly about a horizontal axis.

14. A machine for generating a predetermined curve on the faces of teeth of a gear shaped blank, comprising a work spindle, a cutting element positioned to engage the teeth of the blank, supports for the cutting element and work spindle mounted for relative linear movement, an abutment adapted to be fixed in different positions with respect to the cutter support, a cam adjustable angularly on the work spindle toward and from said abutment and engaging said abutment, means for oscillating the work spindle about its axis to move the blank into and out of engagement with the cutting element, and means for indexing the blank while it is held out of engagement with the cutting element by said cam.

15. A machine for generating a predetermined involute curve on the faces of teeth of a gear shaped blank comprising a work spindle, a cutting element positioned to engage the teeth of a blank, a support for the work spindle, a support for the cutting element, one of said supports being mounted for linear movement, an abutment fixed with respect to the cutter support, a cam mounted on the spindle and having an engaging face formed on a spiral curve having a uniform lead along a straight line and of greater angular length than a tooth face of the gear blank, said cam engaging said abutment in the line of uniform lead parallel with the direction of said linear movement of the support, means for adjusting the cam angularly with respect to the blank, and means for oscillating the cam and spindle.

16. A machine for generating a predetermined involute curve on the faces of teeth of a gear shaped blank comprising a work spindle, a cutting element positioned to engage the teeth of a blank, a support for the work spindle, a support for the cutting element, one of said supports being mounted for linear movement, an abutment fixed with respect to the cutter support, a cam adjustably fixed to the spindle and having its engaging face formed on the involute of a circle, said cam engaging said abutment in a line parallel with the direction of said linear movement of the support and tangent to the evolute of the cam face, means for oscillating the cam and spindle, and means for simultaneously adjusting the work spindle support and abutment about an axis parallel with the work spindle.

17. A machine for generating a predetermined involute curve on the faces of teeth of a gear shaped blank comprising a work spindle, a cutting element positioned to engage the teeth of a blank, a support for the work spindle, a support for the cutting element, one of said supports being mounted for linear movement, an abutment fixed with respect to the cutter support, a cam adjustably fixed to the spindle and having an engaging face formed on a spiral curve having a uniform lead along a straight line, said cam engaging said abutment in the line of uniform lead parallel with the direction of said linear movement of the support, means for oscillating the cam and spindle, and means for adjusting one of said supports about an axis parallel with the work spindle.

18. A machine for generating a predetermined involute curve on the faces of teeth of a gear shaped blank comprising a work spindle, a cutting element positioned to engage the teeth of a blank, a support for the work spindle, a support for the cutting element, one of said supports being mounted for linear movement, an abutment fixed with respect to the cutter support, a cam adjustably fixed to the spindle and having an engaging face formed on a spiral curve having a uniform lead along a straight line, said cam engaging said abutment in the line of uniform lead parallel with the direction of said linear movement of the support, means for oscillating the cam and spindle, and a counterweight connected to the movable support for yieldably holding the cam and abutment in engagement.

19. A machine for generating a predetermined involute curve on the faces of teeth of a gear shaped blank comprising a work spindle, a cutting element positioned to engage the teeth of a blank, a support for the work spindle, a support for the cutting element, one of said supports being mounted for linear movement, an abutment fixed with respect to the cutter support, a cam adjustably fixed to the spindle and having an engaging face formed on a spiral curve having a uniform lead along a straight line, said cam engaging said abutment in the line of uniform lead parallel with the direction of said linear movement of the support, means connected to the cam for oscillating the same through a predetermined angle, means for locking the spindle to the cam during a portion of the oscillation, and means for turning the spindle with respect to the cam during the remainder of the oscillation.

20. In a machine of the character described, a work spindle, a rotatable cutting element mounted to engage a blank on the work spindle, relatively movable supports for the cutting element and work spindle, a cam mounted on the work spindle, means for continuously driving the cutting element, means for oscillating the cam, means for locking the spindle to the cam, an abutment fixed with respect to the cutter support and engaged with the cam, and a counterweight connected to the movable support for maintaining the same in a position in which the cam engages the abutment.

21. In a machine of the character described, a work spindle mounted for linear movement in a radial direction, a cam attached to the work spindle, a fixed abutment with which the cam engages, a cutting element mounted in a position to engage with a blank carried by the spindle, means for driving the cutting element, means for oscillating the cam and spindle, means for locking the cam to the spindle during a portion of each stroke thereof and for turning the spindle with respect to the cam during the remainder of the stroke, and manually operable means for adjusting the blank angularly with respect to the cam.

22. In a machine of the character described, a work spindle mounted for linear movement in a radial direction, a cam attached to the work spindle, a fixed abutment with which the cam engages, a cutting element mounted in a position to engage with a blank carried by the spindle, means for driving the cutting element, means for oscillating the cam, automatically operated actuating means for intermittently turning the work spindle with respect to the cam, and manually operable means for turning the work spindle with respect to the cam to adjust the blank.

23. In a machine of the character described, a work spindle mounted for linear movement in a radial direction, a cam attached to the work spindle, a fixed abutment with which the work spindle, a fixed abutment with which the cam engages, a cutting element mounted in a position to engage with a blank carried by the spindle, means for driving the cutting element, means for oscillating the cam, means for varying the angle of oscillation of the cam, and means for intermittently turning the work spindle with respect to the cam.

24. In a machine of the character described, a work spindle mounted for linear movement in a radial direction, a cam attached to the work spindle, a fixed abutment with which the cam engages, a cutting element mounted in a position to engage with a blank carried by the spindle, means for driving the cutting element, means for oscillating the cam about the axis of the work spindle and for varying the angular speed thereof during each oscillation, and indexing means connected to the work spindle for turning the work spindle through a predetermined angle during the more rapid portion of each oscillation of the cam.

25. In a device of the character described, a cutting element operating in a given plane, a slide for supporting a blank and movable to carry the blank into and out of engagement with the cutting element, an angularly adjustable support for said slide, and means for imparting a rotative movement to the blank and a simultaneous linear movement of said slide laterally with respect to the cutting element comprising a cam connected to the blank to turn therewith and a fixed abutment on said angularly adjustable support with which the cam engages.

26. In a device for generating involute curves on the faces of teeth of a gear shaped blank, a cutting element, means for supporting a blank in engagement with the cutting element, and means for imparting a rotative movement to the blank and a simultaneous linear movement laterally with respect to the cutter comprising a cam carried by the blank supporting means and connected to the blank to turn therewith and a fixed abutment with which the cam engages, said cam having an abutment engaging face formed on a curve different from the curve to be generated on the teeth but such as cause a linear movement of the blank at a speed which has a constant ratio to the angular speed thereof.

27. A machine for generating involute surfaces on blanks comprising a cutting element operating in a fixed plane, a work spindle mounted for movement in a direction radial with respect to its axis and toward and from said cutting element, an abutment adjustable along the line of movement of the spindle, a cam mounted on the work spindle and engaging said abutment, said cam having its abutment engaging face formed on a spiral curve which has a uniform lead along a straight line, means for oscillating said cam and work spindle, and means for varying the angle of oscillation.

28. A machine for generating involute surfaces on blanks comprising a cutting element operating in a fixed plane, a work spindle mounted for movement in a direction radial with respect to its axis and toward and from said cutting element, a fixed abutment, a cam mounted on the work spindle and engaging said abutment, said cam having its abutment engaging face formed on a spiral curve which has a uniform lead along a straight line, means for oscillating the cam through a predetermined angle and for increasing the angular speed thereof at one end of the stroke, means for automatically locking the cam to the spindle during a portion of its oscillation, and means for turning the spindle through a predetermined angle during the portion of the oscillation in which the cam is moving at its highest speed.

29. A machine for generating involute surfaces on blanks comprising a cutting element operating in a fixed plane, a work spindle mounted for movement in a direction radial with respect to its axis and toward and from said cutting element, a fixed abutment, a cam mounted on the work spindle and engaging said abutment, said cam having its abutment engaging face formed on a spiral curve which has a uniform lead along a straight line, means for oscillating said cam and work spindle, and means for adjusting the spindle angularly with respect to the cam.

30. A machine for generating involute surfaces on blanks comprising a cutting element operating in a fixed plane, a work spindle mounted for movement in a direction radial with respect to its axis and toward and from said cutting element, a fixed abutment, a cam mounted on the work spindle and engaging said abutment, said cam having its abutment engaging face formed on a spiral curve which has a uniform lead along a straight line, means for oscillating said cam and work spindle, and independent means for adjusting the spindle and cam angularly about the axis of the spindle.

31. A machine for generating involute surfaces on blanks comprising a cutting element operating in a fixed plane, a work spindle, a work spindle slide mounted for linear movement toward and from the plane of the cutter and radially with respect to the axis of the spindle, a cam mounted on said spindle and having its engaging face formed on a spiral curve which has a uniform lead along a straight line, an abutment member mounted on a support fixed with respect to the slide and contacting with said cam at a point in a line parallel with the direction of movement of the slide and along which the face of the cam has a uniform lead, means for locking the cam to the spindle, means for adjusting said abutment member on the support toward and from the work spindle, and means for oscillating the cam.

32. A machine for generating involute surfaces on blanks comprising a cutting element operating in a fixed plane, a work spindle, a work spindle slide mounted for linear movement toward and from the plane of the cutter and radially with respect to the axis of the spindle, a cam mounted on said spindle and having its engaging face formed on a spiral curve which has a uniform lead along a straight line, an abutment member mounted on a support fixed with respect to the slide and contacting with said cam at a point in a line parallel with the direction of movement of the slide and along which the face of the cam has a uniform lead, means for locking the cam to the spindle, means for oscillating the cam, and means for yieldably pressing the slide toward the abutment.

33. A machine for generating involute surfaces on blanks comprising a cutting element operating in a fixed plane, a work spindle, a work spindle slide mounted for linear movement toward and from the plane of the cutter and radially with respect to the axis of the spindle, a cam mounted on said spindle and having its engaging face formed on a spiral curve which has a uniform lead along a straight line, an abutment member mounted on a support fixed with respect to the slide and contacting with said cam at a point in a line parallel with the direction of movement of the slide and along which the face of the cam has a uniform lead, means for locking the cam to the spindle, means for oscillating the cam, and a counterweight connected to said slide and acting to hold the same with the cam in engagement with the abutment.

34. A machine for generating involute surfaces on blanks comprising a cutting element operating in a fixed plane, a work spindle, a work spindle slide mounted for linear movement toward and from the plane of the cutter and radially with respect to the axis of the spindle, a cam mounted on said spindle and having its engaging face formed on a spiral curve which has a uniform lead along a straight line, an abutment member mounted on a support fixed with respect to the slide and contacting with said cam at a point in a line parallel with the direction of movement of the slide and along which the face of the cam has a uniform lead, means for locking the cam to the spindle, means for oscillating the cam, and an angularly adjustable support upon which said slide and abutment are mounted.

35. A machine for generating involute surfaces on blanks comprising a cutting element operating in a fixed plane, a work spindle, a work spindle slide mounted for linear movement toward and from the plane of the cutter and radially with respect to the axis of the spindle, a cam mounted on said spindle and having its engaging face formed on a spiral curve different from the curve to be generated and which has a uniform lead along a straight line, an abutment member mounted on a support fixed with respect to the slide and contacting with said cam at a point in a line parallel with the direction of movement of the slide and along which the face of the cam has a uniform lead, means for locking the cam to the spindle, means for oscillating the cam, and means for intermittently releasing said locking means and turning said spindle with respect to the cam.

36. A machine for generating on blanks, surfaces conforming to a given curve comprising a cutting element operating in a fixed plane, a work spindle mounted for linear movement in a direction radial with respect to its axis, means to impart a turning movement to the spindle while a blank thereon is engaging the cutting element, and means for turning the spindle and for simultaneously imparting a linear movement thereto including a cam formed on a curve different from the curve to be generated but so related to the curve to be generated that the linear movement of the spindle is so proportioned to the angular movement thereof, in the normal actuation thereof by the cam, that the given curve on the blank is maintained tangent to the plane of the cutting element.

37. A machine for generating on blanks, surfaces comforming to a given curve comprising a cutting element operating in a fixed plane, a work spindle mounted for linear movement in a direction radial with respect to its axis, means to impart a turning movement to the spindle while a blank thereon is engaging the cutting element, and means for turning the spindle and for simultaneously imparting a linear movement thereto including a cam on the spindle and a fixed abutment with which the cam engages, the abutment engaging face of the cam being formed on a curve different from the curve to be generated but so related to the curve to be generated that the linear movement of the spindle is so proportioned to the angular movement thereof, in the normal actuation thereof by the cam, that the given curve on the blank is maintained tangent to the plane of the cutting element.

38. A machine for generating involute curves on the faces of the teeth of a gear shaped blank, comprising a rotatable cutting element having a tooth engaging portion in a fixed plane, a work spindle mounted for linear movement in a direction radial to its axis and toward and from the plane of the cutter, means for shifting the spindle including a cam coaxial with the work spindle and having its periphery conforming to a spiral curve different from the curve to be generated but having a uniform lead along a straight line, means for driving the cutter, means for oscillating said cam through a predetermined angle, means for locking the spindle to the cam during a portion of each oscillation thereof and for releasing the spindle during the remainder of the oscillation, and indexing means for turning the spindle through an angle equal to the angle between successive teeth of the blank during each interval in which the spindle is released from the cam.

39. A machine for generating involute curves on the faces of the teeth of a gear shaped blank, comprising a rotatable cutting element having a tooth engaging portion in a fixed plane, a work spindle mounted for linear movement in a direction radial to its axis and toward and from the plane of the cutter, means for shifting the spindle including a cam coaxial with the work spindle and having its periphery conforming to a spiral curve having a uniform lead along a straight line, means for driving the cutter, means for oscillating said cam through a predetermined angle and for moving the same at a higher speed at one end of its stroke, means for locking the spindle to the cam during the slower portion of each oscillation thereof and for releasing the spindle during the remainder of the oscillation, indexing means for turning the spindle through an angle equal to the angle between successive teeth of the blank during each interval in which the spindle is released from the cam, and a common drive for said cam oscillating and indexing means.

40. A machine for generating involute curves on the faces of the teeth of a gear shaped blank, comprising a rotatable cutting element having a tooth engaging portion in a fixed plane, a work spindle mounted for linear movement in a direction radial to its axis and toward and from the plane of the cutter, means for shifting the spindle including a cam coaxial with the work spindle and having its periphery conforming to a spiral curve having a uniform lead along a straight line, means for driving the cutter, means for oscillating said cam through a predetermined angle, means for locking the spindle to the cam during a portion of each oscillation thereof and for releasing the spindle during the remainder of the oscillation, indexing means for turning the spindle through an angle equal to the angle between successive teeth of the blank during each interval in which the spindle is released from the cam, a common driving member for the cam oscillating and indexing means, and means for operating said driving member manually and for operating said driving member by power means.

41. A machine for generating involute curves on the faces of the teeth of a gear shaped blank, comprising a rotatable cutting element having a tooth engaging portion in a fixed plane, a work spindle mounted for linear movement in a direction radial to its axis and toward and from the plane of the cutter, means for shifting the spindle including a cam coaxial with the work spindle and having its periphery conforming to a spiral curve having a uniform lead along a straight line, means for driving the cutter, means for oscillating said cam through a predetermined angle, means for locking the spindle to the cam during a portion of each oscillation thereof and for releasing the spindle during the remainder of the oscillation, indexing means for turning the spindle through an angle equal to the angle between successive teeth of the blank during each interval in which the spindle is released from the cam, and manually operable means for adjusting the cam angularly with respect to the spindle.

42. A machine for generating predetermined curves on the faces of the teeth of a gear shaped blank, comprising a rotatable cutting element having a tooth engaging portion in a fixed plane, means for driving the cutter, a bed extending transversely of the plane of the cutter and adjustable angularly about a transverse axis, a head slidably mounted on said bed for movement thereon transversely with respect to the plane of the cutter, a spindle mounted on the head transversely with respect to the direction of movement thereof and parallel with the pivotal axis of the bed, means for reciprocating the head comprising an abutment fixed to the bed, a cam carried by the head concentric with the spindle and engaging the abutment, means for oscillating the cam, means for locking the spindle to the cam during a portion of its oscillation and for releasing the spindle therefrom during the remainder of the oscillation, and means for turning the spindle to index the blank during the portion of each oscillation of the cam in which the spindle is free from the cam.

43. A machine for generating a predetermined curve on the faces of the teeth of a gear shaped blank comprising a work spindle, a rotatable cutter having a face engageable with the faces of the teeth of the blank, an abutment fixed with respect to the cutter, a cam coaxial with the spindle and engaging said abutment, means for oscillating said cam, and means for locking said cam to said spindle to cause the blank to turn with the cam, said cam having an abutment engaging face formed on a curve different from the curve to be generated but such as to cause a relative movement between the blank and cutter which is identical with the relative movement which would be caused by the face of a tooth of the blank finished to the predetermined curve acting against the face of the cutter.

44. A machine for generating a predetermined portion of an involute curve on the faces of the teeth of a gear shaped blank comprising a work spindle, a rotatable cutter having a face engageable with the faces of the teeth of the blank, an abutment fixed with respect to the cutter, a cam coaxial with the spindle and having a face formed on an involute curve different from the involute curve to be generated and engaging said abutment, means for oscillating said cam, and means for locking said cam to said spindle to cause the blank to turn with the cam.

45. A machine for generating a predetermined curve on the faces of the teeth of a gear shaped blank comprising a work spindle, a rotatable cutter having a face engageable with the faces of the teeth of the blank, an abutment fixed with respect to the cutter, a cam coaxial with the spindle and engaging said abutment, means for oscillating said cam, means for locking said cam to said spindle to cause the blank to turn with the cam, said cam having an abutment engaging face formed on a curve different from the curve to be generated but such as to cause a relative movement between the blank and cutter which is identical with the relative movement which would be caused by the face of a tooth of the blank finished to the predetermined curve acting against the face of the cutter, and means for indexing the blank with respect to the cutter.

46. In a machine of the character described, a cutting element, a support for said element, a work support, one of said supports being mounted for linear movement, a sleeve journaled in the work support, an inner sleeve journaled within said first mentioned sleeve, a work carrying spindle journaled within the last mentioned sleeve, means for adjustably securing the spindle to the inner sleeve, means for intermittently locking the two sleeves together, means for oscillating the outer sleeve, means for turning the inner sleeve and spindle during the intervals in which the inner sleeve is released from the outer, an abutment fixed with respect to the cutter support, and a cam carried by the outer sleeve and engaging said abutment.

47. In a machine of the character described, a support, a sleeve journaled in said support, a spindle journaled in said sleeve, a worm gear carried by the spindle, a worm carried by the sleeve and meshing with said gear, a member rotatable on the spindle, and gearing connecting said member to the worm.

48. In a machine of the character described, a support, a sleeve journaled in said support, a spindle journaled in said sleeve, a worm gear carried by the spindle, a shaft journaled in the sleeve and having a worm meshing with said gear, a spiral gear on said shaft, and a crown spiral gear rotatably mounted on said spindle meshing with the spiral gear on said shaft.

49. In a machine of the character described, a cutting element, a support for said element, a work support, one of said supports being mounted for linear movement, an abutment fixed with respect to the cutter support, a sleeve journaled in the work support, a cam fixed to said sleeve and engaging the abutment, means for imparting an oscillating movement to said sleeve, an inner sleeve journaled in said first mentioned sleeve, means timed with respect to the oscillatory movement of the outer sleeve for intermittently turning said inner sleeve, means for locking the sleeves together during the intervals between actuations of the inner sleeve by said means, a work carrying spindle journaled in the inner sleeve and manually operable means for turning the spindle in the inner sleeve and for locking the spindle in any adjusted position to the inner sleeve.

50. In a machine of the character described, a cutting element, a support for said element, a work support, one of said supports being mounted for linear movement, an abutment fixed with respect to the cutter support, a sleeve journaled in the work support, a cam fixed to said sleeve and engaging the abutment, a drive shaft, means connecting the drive shaft and sleeve to impart an oscillating movement to the sleeve, an inner sleeve journaled in the outer sleeve, gearing carried by said sleeves by which the inner sleeve may be intermittently turned in the outer sleeve, means for driving said gearing from said shaft, and a work carrying spindle within said inner sleeve and secured thereto.

51. In a machine of the character described, a cutting element, a support for said element, a work support, one of said supports being mounted for linear movement, an abutment fixed with respect to the cutter support, a sleeve journaled in the work support, a cam fixed to said sleeve and engaging the abutment, a drive shaft, means connecting the drive shaft and sleeve to impart an oscillating movement to the sleeve, an inner sleeve journaled in the outer sleeve, gearing carried by said sleeves by which the inner sleeve may be intermittently turned in the outer sleeve, means for driving said gearing from said shaft, a work carrying spindle journaled in the inner sleeve, and manually operable self locking gearing interposed between the inner sleeve and spindle by which said spindle may be adjusted in the sleeve.

52. In a machine of the character described, a cutting element, a support for said element, a work support, one of said supports being mounted for linear movement, an abutment fixed with respect to the cutter support, a sleeve journaled in the work support, a cam fixed to the sleeve and engaging the abutment, an index housing member secured to said sleeve, a shaft having a crank arm, a connecting rod connected to said sleeve and crank arm, a work carrying spindle journaled within said sleeve, a gear fixed to the spindle, gearing carried by the housing member for intermittently driving the spindle, a driving member, and driving connections from said driving member to the said gearing and to said crank shaft.

53. In a machine of the character described, a cutting element, a support for said element, a work support, one of said supports being mounted for linear movement, an abutment fixed with respect to the cutter support, a sleeve journaled in the work support, a cam fixed to the sleeve and engaging the abutment, an index housing member secured to said sleeve, a shaft having a crank arm, a connecting rod connected to said sleeve and crank arm, a work carrying spindle journaled within said sleeve, a gear fixed to the spindle, gearing carried by the housing member for intermittently driving the spindle, means operated by said gearing for locking the spindle to the sleeve during the intervals between the actuations thereof by said gearing, a driving member, and driving connections from said driving member to said gearing and to said crank shaft.

54. In a machine of the character described, a cutting element, a support for said element, a work support, one of said supports being mounted for linear movement, an abutment fixed with respect to the cutter support, a sleeve journaled in the work support, a cam fixed to the sleeve and engaging the abutment, an index housing member secured to said sleeve, a shaft having a crank arm, a connecting rod connected to said sleeve and crank arm, a work carrying spindle journaled within said sleeve, a gear fixed to the spindle, gearing carried by the housing member for intermittently driving the spindle, a pawl and ratchet device for locking the spindle to the sleeve, a cam actuated by said gearing for operating the pawl, and means for driving said gearing and for operating said crank shaft in timed relation to the intermittent actuation of the spindle by said gearing.

55. In a machine of the character described, a cutting element, a support for said element, a work support, one of said supports being mounted for linear movement, an abutment fixed with respect to the cutter support, a sleeve journaled in the work support, a cam fixed to the sleeve and engaging the abutment, an index housing member secured to said sleeve, a shaft having a crank arm, a connecting rod connected to said sleeve and crank arm, a work carrying spindle journaled within said sleeve, a gear fixed to the spindle, gearing carried by the housing member for intermittently driving the spindle, a driving member, driving connections from said driving member to the said gearing and to said crank shaft, and means for varying the effective length of the connecting rod to adjust the cam angularly.

56. In a machine of the character described, a rotatable cutting element having a cutting face operating in a fixed plane, means for driving said cutting element, a supporting member swiveled on an axis transverse to the axis of the cutting element, means for adjusting the supporting member about its axis and for securing the same in adjusted position, a slide carried by the supporting member and movable longitudinally thereof, a sleeve journaled in the slide, a spindle journaled within the sleeve, a cam fixed to the sleeve, a tailstock adjustable longitudinally of the supporting member, an abutment carried by the tailstock with which the cam engages, means on the spindle for securing a blank in a position to engage with the cutter, means for oscillating the sleeve to move the cam through a predetermined arc to cause movement of the slide by the action of the cam against the abutment to bring a blank on the spindle into and out of engagement with the cutting element, and means for indexing the work spindle during the intervals in which the blank is out of engagement with the cutter.

57. In a machine of the character described, a rotatable cutting element having a cutting face operating in a fixed plane, means for driving said cutting element, a supporting member swiveled on an axis transverse to the axis of the cutting element, means for adjusting the supporting member about its axis and for securing the same in adjusted position, a slide carried by the supporting member and movable longitudinally thereof, a sleeve journaled in the slide, a spindle journaled within the sleeve, a cam fixed to the sleeve, a tailstock adjustable longitudinally of the supporting member, an abutment carried by the tailstock with which the cam engages, means on the spindle for securing a blank in a position to engage with the cutter, means for oscillating the sleeve to move the cam through a predetermined arc to cause movement of the slide by the action of the cam against the abutment to bring a blank on the spindle into and out of engagement with the cutting element, means for varying the angle of oscillation of the cam carrying sleeve, and means for indexing the work spindle during the intervals in which the blank is out of engagement with the cutter.

58. In a machine of the character described, a rotatable cutting element having a cutting face operating in a fixed plane, means for driving said cutting element, a supporting member swiveled on an axis transverse to the axis of the cutting element, means for adjusting the supporting member about its axis and for securing the same in adjusted position, a slide carried by the supporting member and movable longitudinally thereof, a sleeve journaled in the slide, a spindle journaled within the sleeve, a cam fixed to the sleeve, a tailstock adjustable longitudinally of the supporting member, an abutment carried by the tailstock with which the cam engages, means on the spindle for securing a blank in a position to engage with the cutter, means for oscillating the sleeve to move the cam through a predetermined arc to cause movement of the slide by the action of the cam against the abutment to bring a blank on the spindle into and out of engagement with the cutting element, a counterweight connected with the slide and acting to hold the slide in positions in which the cam engages the abutment, and means for indexing the work spindle during the intervals in which the blank is out of engagement with the cutter.

59. In a machine of the character described, a rotatable cutting element having a cutting face operating in a fixed plane, means for driving said cutting element, a supporting member swiveled on an axis transverse to the axis of the cutting element, means for adjusting the supporting member about its axis and for securing the same in adjusted position, a slide carried by the supporting member and movable longitudinally thereof, a sleeve journaled in the slide, a spindle journaled within the sleeve, a cam fixed to the sleeve, a tailstock adjustable longitudinally of the supporting member, an abutment carried by the tailstock with which the cam engages, means on the spindle for securing a blank in a position to engage with the cutter, means for oscillating the sleeve to move the cam through a predetermined arc to cause movement of the slide by the action of the cam against the abutment to bring a blank on the spindle into and out of engagement with the cutting element, means for adjusting the cam angularly with respect to the spindle, and means for indexing the work spindle during the intervals in which the blank is out of engagement with the cutter.

60. In a machine of the character described, a supporting frame, a rotatable cutting element having a cutting face operating in a fixed plane, a support for the cutting element mounted for angular adjustment about a fixed axis on the frame, means for adjusting said cutting element vertically in the frame, a head mounted on the frame for movement toward and from the cutting face, a work carrying spindle journaled in said head, said spindle being adapted to support a blank in a position to engage the cutting element and having its axis transverse to the axis of the cutting element, a cam carried by the spindle, a fixed abutment with which the cam engages, means for oscillating the cam, and means for locking the cam to the spindle during a portion of the oscillation and for turning the spindle with respect to the cam during the remainder of the oscillation.

61. In a machine of the character described, a supporting frame, a rotatable cutting element having a cutting face operating in a fixed plane, a support for the cutting element mounted for angular adjustment about a fixed axis on the frame, means for adjusting said cutting element vertically in the frame, a head mounted on the frame for movement toward and from the cutting face, a work carrying spindle journaled in said head, said spindle being adapted to support a blank in a position to engage the cutting element and having its axis transverse to the axis of the cutting element, means for oscillating the spindle and for simultaneously moving the head toward and from the cutting face to move the blank carried by the spindle into and out of engagement with the cutter, and means for varying the angle of oscillation of the spindle and for simultaneously varying the extent of linear movement of the head.

62. In a machine of the character described, a supporting frame, a rotatable cutting element having a cutting face operating in a fixed plane, a support for the cutting element mounted for angular adjustment about a fixed axis on the frame, means for adjusting said cutting element vertically in the frame, a head mounted on the frame for movement toward and from the cutting face, a work carrying spindle journaled in said head, said spindle being adapted to support a blank in a position to engage the cutting element and having its axis transverse to the axis of the cutting element, means for imparting to the spindle a turning movement about its axis and for simultaneously imparting a linear movement to the head away from the cutting face to move the blank out of engagement therewith, and means for indexing the blank while out of engagement with the cutter.

63. In a machine of the character described, a rotatable cutting element having a cutting face operating in a fixed plane, a work carrying spindle having means for securing a blank thereto in a position to engage the cutting element, means for imparting to the spindle an oscillating movement and for simultaneously imparting thereto a linear reciprocating movement in a direction radial with respect to its axis toward and from the cutting face, and means for varying the angle of oscillation and simultaneously varying the extent of linear movement thereof.

64. In a machine of the character described, a rotatable cutting element having a cutting face operating in a fixed plane, a work carrying spindle having means for securing a blank thereto in a position to engage the cutting element, means for imparting to the spindle an oscillating movement and for simultaneously imparting thereto a linear reciprocating movement in a direction radial with respect to its axis toward and from the cutting face, means for varying the angle of oscillation and simultaneously varying the extent of linear movement thereof, and means for supporting the spindle for linear movement in planes at different angles to the cutting face.

65. In a machine of the character described, a rotatable cutting element having a cutting face operating in a fixed plane, a work carrying spindle having means for securing a blank thereto in a position to engage the cutting element, means for imparting to the spindle an oscillating movement and for simultaneously imparting thereto a linear reciprocating movement in a direction radial with respect to its axis toward and from the cutting face, the rate of linear movement of the spindle being at a predetermined ratio to the rate of angular movement thereof, means for increasing or decreasing the extent of angular movement of the spindle and for simultaneously and correspondingly increasing or decreasing the extent of linear movement thereof.

66. In a machine of the character described, a rotatable cutting element having a cutting face operating in a fixed plane, a work carrying spindle having means for securing a blank thereto in a position to engage the cutting element, means for imparting to the spindle an oscillating movement and for simultaneously imparting thereto a linear reciprocating movement in a direction radial with respect to its axis toward and from the cutting face, the rate of linear movement of the spindle being at a predetermined ratio to the rate of angular movement thereof, means for increasing or decreasing the extent of angular movement of the spindle and for simultaneously and correspondingly increasing or decreasing the extent of linear movement, and means for supporting the spindle for linear movement in planes at different angles to the cutting face.

67. In a machine of the character described, a rotatable cutting element having a cutting face operating in a fixed plane, a work carrying spindle having means for securing a blank thereto in a position to engage the cutting element, means for imparting to the spindle an oscillating movement and for simultaneously imparting thereto a linear reciprocating movement in a direction radial with respect to its axis toward and from the cutting face, the rate of linear movement of the spindle being at a predetermined ratio to the rate of angular movement thereof, means for increasing or decreasing the extent of angular movement of the spindle and for simultaneously and correspondingly increasing or decreasing the extent of linear movement, means for adjusting the cutting element toward and from the axis of the work spindle and angularly with respect thereto, and means for adjusting the spindle with respect to the cutting element.

68. In a machine of the character described, a supporting frame, a rotatable cutting element having a cutting face operating in a fixed plane, a standard on which the cutting element is mounted, said standard being adjustable about a fixed axis on the frame, a worm gear carried by said standard, a manually operable shaft having a worm meshing with said gear, means associated with the standard for indicating angular positions thereof, and means associated with said shaft for indicating angular positions thereof, and a work carrying spindle having means for supporting a blank for engagement with said cutting element.

69. In a machine of the character described, a supporting frame, a standard mounted for adjustment about a fixed axis on the frame, a worm gear fixed to the standard, a manually operable shaft journaled in the frame and having a worm meshing with said gear, means associated with the standard for indicating positions of angular adjustment thereof and means associated with the shaft for indicating angular adjustments thereof.

70. In a machine of the character described, a supporting frame, a standard mounted on the frame for adjustment about a vertical axis, a head slidable on the standard, means for adjusting the head on the standard, a supporting member mounted on the frame adjacent the standard for adjustment about a horizontal axis, a slide mounted on said supporting member, a cutter spindle journaled in the head on said standard, and a work spindle journaled on the head on said supporting member.

71. In a machine of the character described, a supporting frame, a guide member mounted on the frame for adjustment about an axis extending longitudinally of said member, a head mounted on said member for adjustment longitudinally thereof, a spindle journaled in said head and positioned transversely with respect to said pivotal axis, a grooved pulley fixed to said spindle, grooved guide pulleys mounted on said head on opposite sides of said first mentioned pulley and offset laterally with respect thereto, a grooved pulley mounted on the standard, a grooved pulley mounted on the frame, a belt passing over the pulleys on the frame, standard and spindle with its inner face engaging said pulleys and over the guide pulleys on the head with its outer face engaging said guide pulleys, and means for driving said belt.

72. In a machine of the character described, a rotatable grinding disk mounted for adjustment in a direction radial with respect to its axis of rotation and for angular adjustment about an axis at right angles to its axis of rotation, a dressing tool mounted for reciprocating movement across the face of the disk, a support for said tool mounted for adjustments corresponding to the adjustments of the grinding disk and adjustable to shift the tool into and out of engagement with the disk, and manually operable means for reciprocating said tool.

73. In a machine of the character described, a supporting frame, a guide member mounted on the frame for adjustment about an axis extending longitudinally of said member, a head mounted on said member for adjustment longitudinally thereof, a spindle journaled in said head and positioned transversely with respect to said pivotal axis, a grinding disk fixed to said spindle, a second head slidable on said standard, a member mounted in said second head for reciprocating movement in a plane parallel with the face of the disk, a dressing tool mounted for lateral adjustment in said member, and means for reciprocating said tool carrying member.

74. In a machine of the character described, a spindle supporting head, a spindle extending through said head, thrust bearings for the spindle at opposite ends of the head, a tool clamping member fixed to one end of the spindle, said member having a shoulder engaging the thrust bearing at the adjacent end of the head, a nut on the opposite end of the spindle and a spring interposed between the nut and the thrust bearing at the adjacent end of the head.

75. In a machine of the character described, a supporting frame, a head mounted for linear movement on said frame, a sleeve journaled in said head, a cam fixed to the sleeve, an abutment fixed to the frame with which the cam engages, a spindle journaled in said sleeve, and means for actuating the sleeve to reciprocate said head comprising a shaft having a disk thereon, a rack bar pivoted eccentrically to said disk, a shaft parallel with the first mentioned shaft, a gear segment fixed to said second shaft, a guide for said rack bar pivotally suspended from said second shaft alongside the segment for maintaining the rack in mesh with the segment, a crank arm fixed to the second shaft and a connecting rod connecting said crank arm to the sleeve.

76. In a machine of the character described, a supporting frame, a head mounted for linear movement on said frame, a sleeve journaled in said head, a cam fixed to the sleeve, an abutment fixed to the frame with which the cam engages, a spindle journaled in said sleeve, and means for actuating the sleeve to reciprocate said head comprising a shaft having a disk thereon, a rack bar pivoted eccentrically to said disk, a shaft parallel with the first mentioned shaft, a gear segment fixed to said second shaft, a guide for said rack bar pivotally suspended from said second shaft alongside the segment for maintaining the rack in mesh with the segment, a crank arm fixed to the second shaft and a connecting rod connecting said crank arm to the sleeve, and means for adjusting the pivotal connection between the disk and rack bar toward and from the center of the disk to vary the throw of the cam.

77. In a machine of the character described, a supporting frame, a head mounted for linear movement on said frame, a sleeve journaled in said head, a cam fixed to the sleeve, an abutment fixed to the frame with which the cam engages, a spindle journaled in said sleeve, and means for actuating the sleeve to reciprocate said head comprising a shaft having a disk thereon, a rack bar pivoted eccentrically to said disk, a shaft parallel with the first mentioned shaft, a gear segment fixed to said second shaft, a guide for said rack bar pivotally suspended from said second shaft alongside the segment for maintaining the rack in mesh with the segment, a crank arm fixed to the second shaft and a connecting rod connecting said crank arm to the sleeve, said connecting rod having an adjustable connection with said crank arm.

78. In a machine of the character described, a cutting element, a work carrying spindle having means for securing a gear-shaped blank thereto in a position to engage the cutting element, means for causing correlated relative generating movements between the cutting element and blank, one moving into and out of engagement with the other with the speed of movement greater throughout the period in which the blank and cutter are disengaged than when the blank and cutter are in engagement, and means for automatically indexing the blank while the same is out of engagement with the cutting element.

79. In a machine of the character described, a rotatable cutting element having a cutting face operating in a fixed plane, a work carrying spindle having means for securing a blank thereto in a position to engage the cutting element, means for oscillating said spindle through a predetermined angle with the speed of movement decreasing toward one end of the stroke and for simultaneously imparting a correlated reciprocating movement to said spindle in a plane radial to its axis to engage the blank with the cutting element during the low speed portion of the stroke, and means for indexing the blank while the same is out of engagement with the cutting element and during the high speed portion of the stroke of the work spindle.

80. A machine for generating a predetermined curve on the faces of teeth of a gear-shaped blank comprising a work spindle, a cutting element positioned to engage the teeth of the blank, supports for the cutting element and work spindle mounted for relative linear movement, means for oscillating the work spindle, means operatively connected to said work spindle for imparting a reciprocating movement to one of said supports to cause the blank to be engaged with and disengaged from said cutting element, means for automatically indexing the blank while the same is disengaged from the cutting element, and manually operable means independent of said indexing means for turning the work spindle with respect to said support moving means.

81. In a machine of the character described, a cutting element, a support for said element, a work support, one of said supports being mounted for linear movement, a sleeve journaled in the work support, an inner sleeve journaled within said first mentioned sleeve, a work carrying spindle journaled within the last mentioned sleeve, means for adjustably securing the spindle to the inner sleeve, means for intermittently locking the two sleeves together, means for oscillating the outer sleeve, means for turning the inner sleeve and spindle during the intervals in which the inner sleeve is released from the outer, and means operatively connected to the outer sleeve for reciprocating said movably mounted support.

82. In a machine of the character described, a cutting element, a support for said element, a work support, one of said supports being mounted for linear movement, a sleeve journaled in the work support, means for imparting an oscillating movement to said sleeve, an inner sleeve journaled in said first mentioned sleeve, means timed with respect to the oscillating movement of the outer sleeve for intermittently turning said inner sleeve, means for locking the sleeves together during the intervals between actuations of the inner sleeve by said means, a work carrying spindle journaled in the inner sleeve, manually operable means for turning the spindle in the inner sleeve and for locking the spindle in adjusted position therein, and means operatively connected to the first mentioned sleeve for imparting reciprocating movements to said linearly movable support.

83. In a machine of the character described, a cutting element, a support for said element, a work support, one of said supports being mounted for linear movement, a sleeve journaled in the work support, a drive shaft, means connecting the drive shaft and sleeve to impart an oscillating movement to the sleeve, means operatively connected to said sleeve for imparting a reciprocating movement to the linearly movable support upon oscillation of the sleeve, an inner sleeve journaled in the outer sleeve, gearing carried by said sleeves by which the inner sleeve may be intermittently turned in the outer sleeve, means for driving said gearing from said shaft and a work carrying spindle within said inner sleeve and secured thereto.

84. In a machine of the character described, a cutting element, a support for said element, a work support, one of said supports being mounted for linear movement, a sleeve journaled in the work support, an index housing member secured to said sleeve, a shaft having a crank arm, a connecting rod connected to said sleeve and crank arm, a work carrying spindle journaled within said sleeve, a gear fixed to said spindle, gearing carried by the housing member for intermittently driving the spindle, a driving member, driving connections from said driving member to said gearing and to said crank shaft, means operatively connected to the first mentioned sleeve for imparting movement to the linearly movable support, and means for varying the effective length of said connecting rod to adjust said first mentioned sleeve angularly.

85. In a machine of the character described, a supporting frame, a head mounted for linear movement on said frame, a sleeve journaled in said head, means interposed between said sleeve and a part fixed with respect to the frame for imparting linear movement to said head upon a turning movement of said sleeve, and means for oscillating said sleeve to reciprocate said head including a shaft having a disk thereon, a rack bar pivoted eccentrically to said disk, a shaft parallel with the first mentioned shaft, a gear segment fixed to said second shaft, a guide for said rack bar pivotally suspended from said second shaft alongside the segment for maintaining the rack in mesh with the segment, a crank arm fixed to the second shaft, and a connecting rod connecting said crank arm to said sleeve.

86. In a machine of the character described, a supporting frame, a head mounted for linear movement on said frame, a sleeve journaled in said head, means operatively connected to the sleeve for imparting a linear movement to said head upon a turning movement of said sleeve, a spindle journaled in said sleeve, means for actuating the sleeve to reciprocate said head comprising a shaft having a disk thereon, a rack bar pivoted eccentrically to said disk, a shaft parallel with the first mentioned shaft, a gear segment fixed to said second shaft, a guide for said rack bar pivotally suspended from said second shaft alongside the segment for maintaining the rack in mesh with the segment, a crank arm fixed to the second shaft and a connecting rod connecting said crank arm to the sleeve, and means for adjusting the pivotal connection between the disk and rack bar toward and from the center of the disk to vary the angle of oscillation of the sleeve.

87. In a machine of the character described, a supporting frame, a head mounted for linear movement on said frame, a sleeve journaled in said head, means operatively connected to said sleeve for moving said head upon a turning movement of the sleeve, a spindle journaled in said sleeve, means for actuating the sleeve to reciprocate said head comprising a shaft having a disk thereon, a rack bar pivoted eccentrically to said disk, a shaft parallel with the first mentioned shaft, a gear segment fixed to said second shaft, a guide for said rack bar pivotally suspended from said second shaft alongside the segment for maintaining the rack in mesh with the segment, a crank arm fixed to the second shaft and a connecting rod connecting said crank arm to the sleeve, said connecting rod having an adjustable connection with said crank arm.

88. The herein described method of generating the faces of teeth of gear-shaped members to any one of an infinite series of involute curves which comprises, engaging the blank with a cutting element having a tooth engaging portion moving in a single plane, oscillating said blank about its axis and simultaneously imparting a correlated linear movement to the blank in a direction radial to its axis toward and from the cutting element with the plane of movement of the axis of the blank at an angle to the plane of the cutting element, and changing the direction of movement of the blank to generate tooth faces of different curvature.

89. The herein described method of generating the faces of teeth of gear-shaped members to any one of an infinite series of involute curves which comprises, engaging the blank with a cutting element having a tooth engaging portion moving in a single plane, oscillating said blank about its axis and simultaneously imparting a correlated linear movement to the blank in a direction radial to its axis toward and from the cutting element with the plane of movement of the axis of the blank at an angle to the plane of the cutting element by means of a cam fixed to the spindle and having point contact with a fixed abutment, and changing the direction of movement of the blank while maintaining the point contact between the cam and abutment to generate tooth faces of different curvature.

90. In a machine of the character described, a supporting frame, a head mounted for linear movement on said frame, a sleeve journaled in said head, means interposed between said sleeve and a part fixed with respect to the frame for imparting linear movement to said head upon a turning movement of said sleeve, and means for oscillating said sleeve to reciprocate said head including a shaft having a disk thereon, a rack bar pivoted eccentrically to said disk, a shaft parallel with the first mentioned shaft, a gear segment fixed to said second shaft, a guide for said rack bar pivotally suspended from said second shaft alongside the segment for maintaining the rack in mesh with the segment, means carried by said guide for adjusting said rack toward said segment, a crank arm fixed to the second shaft, and a connecting rod connecting said crank arm to said sleeve.

91. In a machine of the character described, a supporting frame, a head mounted for linear movement on said frame, a sleeve journaled in said head, means operatively connected to the sleeve for imparting a linear movement to said head upon a turning movement of said sleeve, a spindle journaled in said sleeve, means for actuating the sleeve to reciprocate said head comprising a shaft having a disk thereon, gearing for driving said disk, means for adjusting said shaft and disk bodily to take up backlash in the gearing, a rack bar pivoted eccentrically to said disk, a shaft parallel with the first mentioned shaft, a gear segment fixed to said second shaft, a guide for said rack bar pivotally suspended from said second shaft alongside the segment for maintaining the rack in mesh with the segment, a crank arm fixed to the second shaft and a connecting rod connecting said crank arm to the sleeve, and means for adjusting the pivotal connection between the disk and rack bar toward and from the center of the disk to vary the angle of oscillation of the sleeve.

92. In a machine of the character described, a cutting element, means for actuating said cutting element, a support for the cutting element which is angularly adjustable about a fixed axis, a member mounted for angular adjustment about an axis perpendicular to the first mentioned axis, a slide mounted for linear movement on said member in a direction transverse to the pivotal axis thereof, a work spindle journaled in said slide having means for supporting a blank in a position to engage said cutting element, and means for simultaneously oscillating said work spindle and imparting correlated linear movements to said slide.

93. A machine for generating a predetermined curve on the faces of teeth of a gear-shaped member, comprising a cutting element, a spindle mounted for movement in a direction radial with respect to its axis toward and from said cutting element, and adapted to have the gear-shaped member secured thereon, a cam mounted on the spindle, and an abutment with which said cam engages, said abutment being adjustable along the line of movement of the spindle toward and from the cutting element whereby flank fullness in the gear-shaped member may be controlled.

94. A machine for generating a predetermined curve on the faces of teeth of a gear-shaped member, comprising a cutting element, a spindle mounted for movement in a direction radial with respect to its axis toward and from said cutting element and adapted to have the gear-shaped member secured thereon, a cam mounted on the spindle, and a roller abutment with which said cam engages, said abutment being adjustable along the line of movement of the spindle toward and from the cutting element whereby flank fullness in the gear-shaped member may be controlled.

95. A machine for generating a predetermined curve on the faces of teeth of a gear-shaped blank comprising a work spindle, a cutting element positioned to engage the teeth of the blank, supports for the cutting element and work spindle mounted for relative linear movement, an abutment fixed with respect to the cutter support, a cam fixed to the work spindle and engaging said abutment, means for oscillating the work spindle about its axis, and means for adjusting the cutting element angularly with respect to the axis of the work for producing helical teeth in the gear-shaped blank.

96. The herein described method of generating the faces of teeth of gear-shaped members to any one of an infinite series of involute curves which comprises engaging the blank with a cutting element having a tooth engaging portion moving in a single plane, oscillating said blank about its axis and simultaneously imparting a correlated linear movement to the blank in a direction radial to its axis toward and from the cutting element with the plane of movement of the axis of the blank at an angle to the plane of the cutting element by means of a spiral cam fixed to the spindle carrying the blank and having point contact with a fixed abutment, and changing the direction of movement of the blank while maintaining the point contact between the cam and abutment to generate tooth faces of different curvature.

97. In a machine of the character described, a work spindle, an index housing operatively connected with said spindle, and means for oscillating said spindle and housing comprising an actuating member operatively connected with said housing adjacent the perimeter thereof and remote from the axis of the work spindle.

98. The herein described method of generating the faces of teeth of gear-shaped members to any one of an infinite series of involute curves and to various helix angles which comprises engaging the blank with a cutting element having a tooth engaging portion moving in a single plane, oscillating the blank about its axis and simultaneously imparting a correlated linear movement to the blank in a direction radial to its axis toward and away from the cutting element with the plane of movement of the axis of the blank at an angle to the plane of the cutting element, changing the direction of movement of the blank to generate tooth faces of different curvature, and changing the angle of the cutting element with respect to the axis of the blank to generate tooth faces of different helix angles.

99. In a machine for generating gear tooth faces, a bed having a guideway, a slide on said bed, a spindle on said slide having means for holding a gear blank, means for oscillating the spindle and simultaneously imparting a linear movement to the slide so correlated to the angular movement of the spindle that the pitch circle of the gear blank rolls without slippage with respect to a plane tangent thereto and parallel with the bed, a cutting element having a tooth generating portion moving in a single plane and means for adjusting said bed angularly about a horizontal axis to vary the angle between the plane of the cutting element and the plane of movement of the gear blank.

100. In a machine for generating gear tooth faces, a bed having a guideway, a slide on said bed, a spindle on said slide having means for holding a gear blank, means for oscillating the spindle and simultaneously imparting a linear movement to the slide so correlated to the angular movement of the spindle that the pitch circle of the gear blank rolls without slippage with respect to a plane tangent thereto and parallel with the bed, a cutting element having a tooth generating portion moving in a single plane, means for adjusting said bed angularly about a horizontal axis to vary the angle between the plane of the cutting element and the plane of movement of the gear blank, and means for adjusting the cutting element about a vertical axis to dispose the plane of the generating portion at an angle to the axis of the blank corresponding to the helix angle of the tooth faces to be generated.

101. In a machine of the character described, a cutting element, a support for said element, a work support, one of said supports being mounted for linear movement, a sleeve journaled in the work support, an index housing secured to said sleeve, a shaft having a crank arm, a connecting rod connected to the outer portion of said housing and to said crank arm for oscillating the sleeve, means operated by the oscillating sleeve for reciprocating said work support, a work carrying spindle journaled within said sleeve, a gear fixed to the spindle, gearing carried by the housing member for intermittently driving the spindle, a driving member, and driving connections from said driving member to the said gearing and to said crank shaft.

In testimony whereof, I hereunto affix my signature.

OLIVER G. SIMMONS.